US012569755B2

(12) United States Patent      (10) Patent No.:   US 12,569,755 B2

Ohlsen et al.      (45) Date of Patent:     Mar. 10, 2026

(54) PLATFORM AGNOSTIC AUTOSCALING MULTIPLAYER INTER AND INTRA SERVER COMMUNICATION MANAGER SYSTEM AND METHOD FOR AR, VR, MIXED REALITY, AND XR CONNECTED SPACES

(71) Applicant: Magnopus, LLC, Los Angeles, CA (US)

(72) Inventors: Tyler Ohlsen, Los Angeles, CA (US); Nigel James Budden, Los Angeles, CA (US); Kevin Mullican, Los Angeles, CA (US); Jerome Meyers, Los Angeles, CA (US)

(73) Assignee: Magnopus, LLC, Los Angeles, CA (US)

( * ) Notice: Subject to any disclaimer, the term of this patent is extended or adjusted under 35 U.S.C. 154(b) by 85 days.

(21) Appl. No.: 17/954,574

(22) Filed: Sep. 28, 2022

(65) Prior Publication Data

US 2023/0102377 A1     Mar. 30, 2023

Related U.S. Application Data

(60) Provisional application No. 63/250,145, filed on Sep. 29, 2021.

(51) Int. Cl.

| | |
|---|---|
| *A63F 13/358* | (2014.01) |
| *A63F 13/352* | (2014.01) |
| *A63F 13/87* | (2014.01) |
| *H04L 67/12* | (2022.01) |

(52) U.S. Cl.

CPC .......... *A63F 13/358* (2014.09); *A63F 13/352* (2014.09); *A63F 13/87* (2014.09); *H04L 67/12* (2013.01); *A63F 2300/513* (2013.01); *A63F 2300/534* (2013.01); *A63F 2300/572* (2013.01)

(58) Field of Classification Search

CPC ...... A63F 13/358; A63F 13/352; A63F 13/87; A63F 2300/513; A63F 2300/534; A63F 2300/572; H04L 67/12

See application file for complete search history.

(56) References Cited

U.S. PATENT DOCUMENTS

| | | | | |
|---|---|---|---|---|
| 7,945,856 | B2 * | 5/2011 | Leahy | ..................... H04L 67/52 |
| | | | | 715/765 |
| 11,504,632 | B1 * | 11/2022 | Schuster | ................ G06F 16/182 |
| 2003/0177187 | A1 * | 9/2003 | Levine | .................. H04L 67/131 |
| | | | | 709/205 |
| 2019/0320038 | A1 * | 10/2019 | Walsh | .................. G06F 16/9574 |
| 2021/0203756 | A1 * | 7/2021 | Yerli | ................... G06F 16/2379 |
| 2021/0279953 | A1 * | 9/2021 | Bouhnik | ................ G06T 19/00 |
| 2021/0397971 | A1 * | 12/2021 | Pardeshi | ............... G06N 3/045 |

\* cited by examiner

*Primary Examiner* — Dmitry Suhol

*Assistant Examiner* — Ankit B Doshi

(74) *Attorney, Agent, or Firm* — Weintraub Tobin; Jo Carothers

(57) ABSTRACT

The present disclosure relates to augmented reality, virtual reality, mixed reality, and extended reality systems, and more specifically, to systems and methods for managing multiplayer communications seamlessly across platforms and distributed geographic locations.

24 Claims, 14 Drawing Sheets

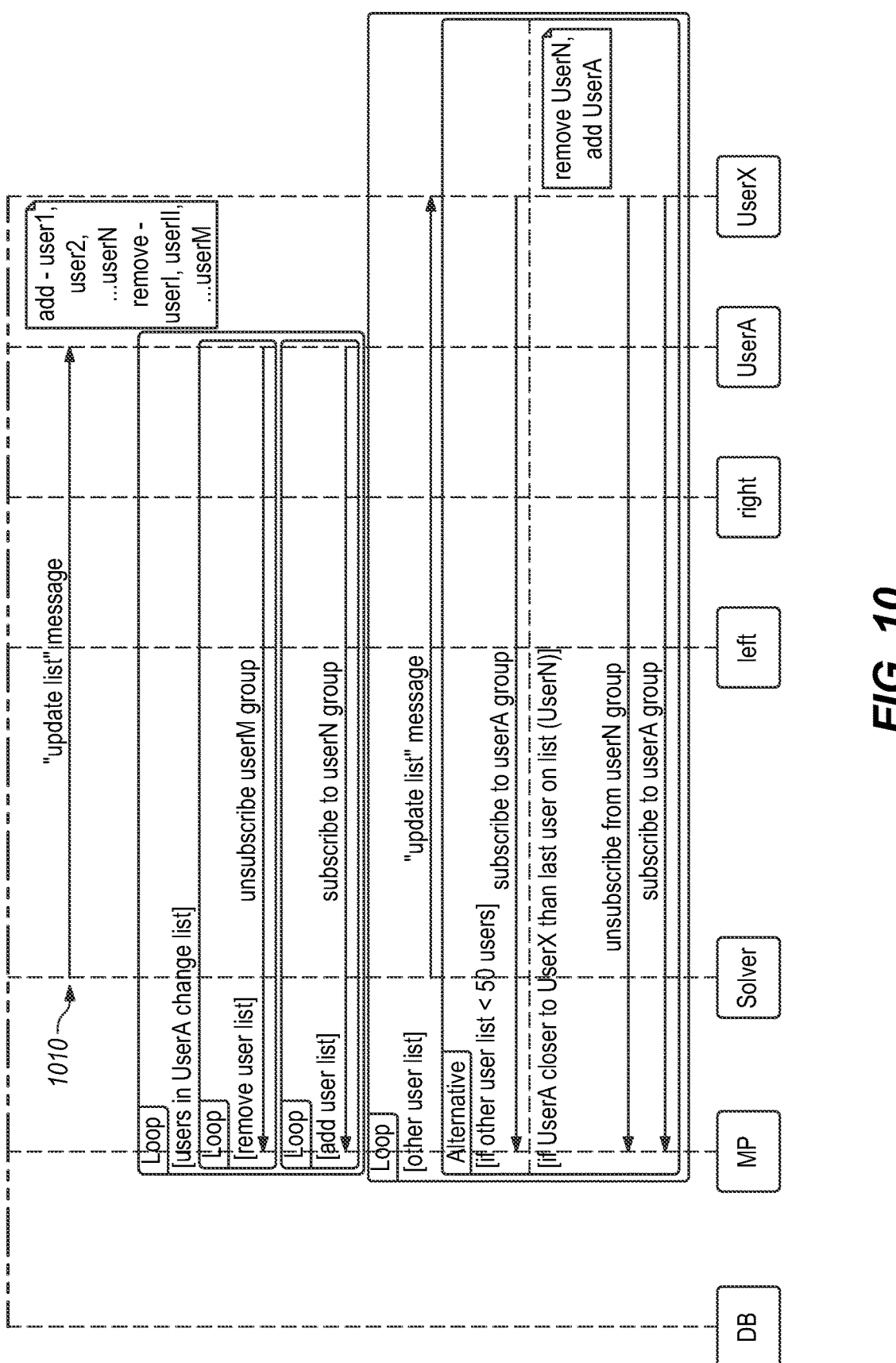
_FIG. 10_
_(Continued)_

PLATFORM AGNOSTIC AUTOSCALING MULTIPLAYER INTER AND INTRA SERVER COMMUNICATION MANAGER SYSTEM AND METHOD FOR AR, VR, MIXED REALITY, AND XR CONNECTED SPACES

CROSS-REFERENCE TO RELATED APPLICATIONS

This application claims priority under 35 USC Section 119(e) to U.S. Provisional Patent Application No. 63/250, 126 entitled "Point of Interest System and Method for AR, VR, MR, and XR Connected Spaces" filed Sep. 29, 2021; U.S. Provisional Patent Application No. 63/250,145 entitled "Platform Agnostic Autoscaling Multiplayer Inter and Intra Server Communication Manager System and Method for AR, VR, Mixed Reality, and XR Connected Spaces" filed Sep. 29, 2021; U.S. Provisional Patent Application No. 63/250,152 entitled "Visual Anchor Based User Coordinate Space Recovery System" filed Sep. 29, 2021; and U.S. Provisional Patent Application No. 63/250,159 entitled "Bidirectional Cross-Platform Library for Automated Reflection" filed Sep. 29, 2021; all of the entire disclosures of which are incorporated herein by reference.

FIELD OF THE INVENTION

The present disclosure relates to augmented reality, virtual reality, mixed reality, and extended reality systems, and more specifically, to systems and methods for managing multiplayer communications.

BACKGROUND OF THE INVENTION

Current systems exist that make use of technologies including augmented reality ("AR"), virtual reality ("VR"), and mixed reality ("MR") which are collectively known as extended reality ("XR"), artificial intelligence ("AI"), and the fifth-generation technology standard ("5G") for broadband cellular networks.

In this context, physical reality often refers to a physical place where a person has to be there to see it and everyone present sees essentially the same thing. MR or AR are similar in that a person is in the physical place, but they differ from physical reality in that the person can see digital content mixed with the physical objects. People present in MR or AR environments can participate in shared experiences, or the content can be unique to an individual and their interests.

In contrast, VR refers to an environment where a person is remote from the physical place but feels like they are in the physical space. The person can see digital content mixed with digital copies of physical objects. The person may also be able to see shared experiences with other people, and/or see content unique to the individual. XR encompasses AR, VR, MR, and those things in between or combinations thereof.

Work in this area includes work on what has been termed the metaverse. While metaverse has multiple meanings, the term is often used more in relation to a fictional, imaginary, and/or virtual world, rather than to a physical world.

Prior work also relates to what has been termed a mirror world. The term mirror world often is used to mean a "digital twin" of the physical world so that a user can access everything in the physical world, such as when playing a 3D video game.

Prior work also includes work on what has been termed the AR Cloud. The AR Cloud concept is about a coordinate system and content delivery.

Initial work has begun on Web XR, which is a standard that will use web technologies to make immersive content available to VR, AR, and two-dimensional ("2D") devices through a web browser. It is desirable to have a system for creating a connected space that can be compatible with the Web XR standard.

Traditionally, massively multiplayer online, or MMO, games run on a series of geographically constrained servers with a limited number of entrants per server. This constrained users to only communicate with other users within the same lobby and the lobby filled to capacity, causing lag and rendering issues. While the techniques around this methodology have improved significantly, sharding still represents the main alternative solution currently in place.

Sharding, or partitioning players by server, can function in a couple of ways. Some games, such as World of Warcraft for example, still shard players based on geographical location in the physical world, but they can now handle significantly more load using balancing techniques. Players can join lobbies that are not close to home, but they will experience significant latency issues.

Other games, such as Eve Online, also shards its players but sorts its partitioning based on location within the virtual world. Therein, users can stay connected to a server close to home but will experience a reload process when they move from one game region to another.

The messaging system behind these games and others are often made for specific types of messages, and message values often communicate a delta, or change, rather than a new absolute value.

While MMO systems have come a long way, there are still considerable limitations that have yet to be addressed for games with a worldwide user base. In order to deliver a customizable platform that allows a large number of highly distributed users to interact with low latency, there are a number of problems that must be overcome.

Consider a geographically distributed conference or event held simultaneously at multiple locations across the globe. One clear advantage that a virtual participant may have over a ticket-holding attendee participating in person at the physical location is the virtual attendee has the ability to quickly virtually visit dispersed venues. This rapid inter-regional travel poses a new problem. A large number of users traveling large geographic-equivalent distances in a virtual world need to be seamlessly handled without disrupting their vision and loaded into a new area. Additionally, as more users join or leave a particular region, physical hardware resources have to adapt to accommodate the flux.

This problem extends to messaging and communication between users. These messages could consist of anything from actual chat strings to position or status updates, and any solution would have to be sufficiently abstract to allow the necessary flexibility. While a visitor explores various regions of a virtual world, they will not only wish to communicate and interact with those in their surrounding region but also with any friends that they intend to meet in the virtual space. This becomes especially complicated if users within their friend group are in an entirely different region within the virtual world. A vast number of messages across different regions must be prioritized and distributed in near real-time.

A final challenge presented to MMO systems by the intersection of VR and physical locations is a space constraint. In reality, only one person can stand in a specific location at a given time, but when a digital twin exists both a physical and virtual user could occupy the exact same coordinates. Ensuring a consistency of view for users across AR and VR will be difficult, but a successful XR MMO system needs to prioritize who and what a user can see in a way that makes sense to each user.

Therefore, it is desirable to create a system and method for use across mixed reality, desktop, web, and mobile platforms for connecting digital and physical spaces that overcomes these limitations.

BRIEF SUMMARY OF THE INVENTION

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

A connected space ("connected space") is any combination and/or augmentation of one or more physical worlds and/or digital worlds, to allow one or more individuals to participate in the resulting spatial experience. Whether physically co-located or geographically dispersed, the connected space can be singularly, continually, or periodically consumed by one or more users at the same time, during overlapping times, or at different times, either synchronously or asynchronously. This invention and disclosure provide a digitization of the places and objects in the physical world that will connect the physical and digital worlds and make the connected space accessible anywhere in real-time.

This invention and disclosure can be used for a connected space that makes the same content as in the physical world accessible through AR devices by turning off the digital twin environment layer and matching the digital content layer to the physical world.

This invention and disclosure can be used with a "digital twin" to AR Cloud content to allow the AR Cloud content to become accessible remotely in a connected space.

This invention and disclosure include a system and method that can be used for a connected space that is accessible collaboratively from devices, such as personal computers, mobile phones, or immersive devices.

In one embodiment, a technology platform (the "Platform") allows users to design, build, and operate a connected space that bridges physical and digital spaces. The Magnopus World Services Platform is one embodiment of an example Platform.

The Platform powers XR experiences to be accessed by users anywhere in the world at any time. It allows multiple users to collaborate in the design and review process, such as when designing a real-world location of interest and simulated mission. The Platform can import a "digital twin" anchored in a real-world location with geo-contextualized data.

In one example embodiment, the Platform allows visualization of assets and mission components as trainers design operational challenges for trainees. The Platform can publish to operate the connected space, enabling end-users to conduct activities (e.g., whether consumers engaging with experiences or enterprise users with operational activities) within the Platform. It also can gather data from trainee performance in missions and easily adjust elements within the missions to create additional operational scenarios.

In another example, physical and digital visitors can be connected in a world filled with AI characters, AR experience activations (e.g., AR art activations), character interactions, experiences, and/or entertaining quests of discovery. A digital twin can be connected to the physical site such that the digital twin is accessible from around the world in VR and through devices such as desktops. The physical site can be a smart environment with an AR interface and mobile apps that respond to visitors. The AR and social capabilities can connect to the IoT infrastructure of the physical site. In one example, this is built on a 5G infrastructure. In one example, humans, avatars, and AI characters can interact. The people, characters, and even objects can interact. Interaction is non-linear, mirroring the real world. For remote visitors, PC or mobile applications, including VR, grant access to the connected space where the remote visitors can connect with the physical content and on-site visitors. Data streams, video, and audio connect visitors in the physical world with those attending virtually.

The Platform provides cross-device flexibility, allowing access to the same connected space across multiple devices, including VR, desktop, mobile (2D and AR), and web. All updates to the core connected space are automatically updated for all devices.

The Platform allows real-time social and multiplayer interaction. Users can interact intuitively with other users with highly naturalistic social mechanics. It utilizes multiplayer technology that governs seamless interactions between users. The MMO system enables the scaling up of users within the Platform and driving multiplayer interactions.

The Platform handles dynamic content, allowing the import and export of environments and assets across multiple standard 3D and 2D file types while scenarios are running.

The Platform provides customizable experiences by defining rules that power events, activities, and exercises that govern a connected space.

The Platform provides data analytics that track user activities and experiences across the connected space. It gathers aggregate data in a dashboard to analyze user activities.

Geo-contextualized data is incorporated by the Visual Positioning System ("VPS"), as disclosed in a co-filed application. The VPS allows for geo-contextualization. Content and experiences in connected spaces are mapped to real-world locations with high accuracy, such as centimeter-level precision. The VPS streams in relevant data feeds such as from IoT devices or other equipment and sensors to create additional contextually relevant experiences within the connected space.

The Point-of-Interest ("POI") tool, as also disclosed in a co-pending application, allows the Platform to place content and experiences within a "map" of the digital twin. The foundation as also disclosed in a co-pending application provides the capabilities for the Platform to be game engine agnostic.

An MMO system and method are disclosed for AR, VR, mixed reality, and XR connected spaces that are platform agnostic and can serve as an autoscaling, multiplayer inter and intra server communication manager.

The purpose of the MMO system is to seamlessly connect users in multiplayer XR applications across platforms and distributed geographic locations. The disclosed approach handles problems that are of particular interest to users in digital twin applications. In large-scale digital twins, users will find themselves traveling virtual distances that could represent a massive distance in real life, and they may need to communicate with any other player regardless of geographic location.

In order to accommodate such movement, the full instances of a game world are hosted across clusters of autoscaling servers with geographic proximity to the player, so reloads are not necessary when traveling across regions. Communication between two players on the same server uses standard methodologies to deliver a low latency solution.

The user service implements support for stateful user information such as inventory and history. The prototype service provides abstract, non-user object prototype and world object instantiation functionality.

The multiplayer service maintains the real-time state of users and objects by geographic region, and broadcasts location and state changes to all other users and objects in the region.

Through the collection of services, though users may enter and exit the world at will, the overall state of the world remains synchronous and persistent. In addition, client applications can request classes of world elements relevant to their function. For example, VR applications would request all geometry in the world, but augmented reality applications would only need user and transient object geometry. The MMO system provides the core components for maintaining a common, interactive world for all users no matter what applications they are using.

The disclosed MMO system is bandwidth conservative and self-healing. The MMO handles and manages messages in an intelligent way that uses patch messages. Client applications can ask for the full object and/or full structure if needed.

However, when two players are on separate servers in a geographically similar region, messages are sent to a global backplane and forwarded to the destination server. More geographically disparate users' messaging runs from backplane to backplane until it reaches the destination service instance. These messages are purposefully abstract to allow for a wide variety of potential message functions.

Messages may only contain a subset of the total data, but always relay the new absolute value rather than a delta to correct for missed messages. If messages are missing prerequisite data both the server and player instances can query each other to self-heal.

All of these messaging features exist across a complex network of servers that auto-scale and balance to accommodate varying user load internationally, and yet from a user perspective, the process is entirely hidden. Therein, a single endpoint automatically determines and assigns the appropriate server without input from the player.

In another embodiment, a more specific messaging system, such as one that communicates a delta, or change, rather than an absolute value, can be tailored to a specific set of messages, which may lead to certain efficiencies. However, that level of specificity removes the flexibility and limits the system. Instead, the disclosed invention has numerous advantages because its messaging systems communicate absolute values. For example, if a single message containing a delta is missed, it could result in a drastically different and inaccurate result, especially if the value of the delta was significant. The disclosed invention avoids these inaccuracies by communicating absolute values. Moreover, messages with absolute values enable self-healing functionality. If only deltas were communicated, there would be no way to reset the absolute position or establish an unknown object on a server. In the disclosed invention by communicating the absolute value, if a prior message was missed, the reset is automatic.

Further, the disclosed invention has advantages in terms of the partitioning approach relative to techniques such as sharding. Sharding approaches limit communication to players within the same server to reduce latency, which is important for games where the real-time position of a player is crucial for the mechanics of the game itself, such as a first-person shooter or multiplayer online battle arena. However, the cost of this level of latency reduction is that players are cut off from communication with other servers. The disclosed invention's communication manager overcomes this disadvantage by allowing communications across servers in exchange for a small increase in latency, and across global backplanes for a slightly larger increase in latency. This disclosed invention is particularly useful where, such as in social applications or role-playing games, where the small increases in latency are worth the flexibility in communications.

The disclosed invention also has advantages in terms of the partitioning approach relative to partitioning approaches based on an in-game location that do not isolate users based on geographic location. While approaches based on in-game location ensure that users can seamlessly communicate with players within their game region, other solutions require a reloading period when a user moves to an area outside the scope of their server. The disclosed invention does not require such a reloading period.

This invention is particularly applicable, but not limited to, the creation of digital twins. In designing virtual spaces that can conservatively span many square kilometers, multiple users could be working together to author points within a virtual space that contains re-creations of actual items in the physical world. Beyond simply recreating a landscape, the authors could also capture momentary events that may change over time.

Connected spaces combined with the physical world provide advantages in several applications, such as for design and planning teams, operations, and visitors.

Design and planning teams can collaborate in the actual space with the assets they already created for a better representation of the finished experience. They can share work between different teams, so the teams stay synchronized. They can review and approve work in context with stakeholders, so there are no surprises.

Before a new operation goes live, simulations can be run to identify operational issues and confirm readiness. If there are data or devices in the environment, it is possible to monitor them in context for faster and better understanding. If live users are trackable through devices or cameras, meaningful analytics can be observed to help deliver the best experience. It also allows pushing content in context to people's mobile devices relevant to the things happening around them.

Connected spaces combined with the physical world also give visitors a better experience and access to richer content, in context, through mobile phones and other devices.

Connected spaces combined with users of mobile AR and mixed reality provide advantages in many applications, such as for design and planning teams, operations, and visitors.

Design and planning teams can walk the space while it is in progress and see what is coming. They can create narrative journeys, such as tour guides, that can satisfy visitors' interests. They can review digital content in context. They can review and approve work in context with stakeholders.

Before a new operation goes live, the team can get an "Iron Man", or mission control, view of the relevant systems and data in the context of the space. It also allows the team to maintain situational awareness for live operations.

Connected spaces combined with users of mobile AR and mixed reality also give visitors access to interactive digital content in context to the physical content personalized to the specific visitors. It allows visitors to know where they are and where they want to go with better wayfinding. It also allows visitors to keep track of friends and family who want to share their locations.

Connected spaces combined with users of VR or remote users on desktop or mobile devices provide advantages in a number of applications, such as for design and planning teams, operations, and visitors.

Design and planning teams can access all the features of mixed reality and regular reality but with superpowers. The lack of constraints from the laws of physics that define purely digital activations unleashes an additional degree of creative freedom and simulation that is not tied to the limitations of a physical environment.

Before a new operation goes live, it is possible to publish and monetize a space to access a remote audience. Connected spaces combined with users of VR or remote users on desktop or mobile devices allow for more space, virtually, for content than the actual physical site offers. Spaces can also be archived so they can live on after the physical space is gone. The team can also manage the live space, see the users, and ensure they are receiving the best experience.

Visitors can access the places and people they want to visit from across the world. It enables remote workforces, reduces travel and conference costs, and provides a unified experience across the physical and digital content.

Accordingly, one or more embodiments of the present invention overcomes one or more of the shortcomings of the known prior art.

For example, in one embodiment, a massively multiplayer online (MMO) system for enabling a massive persistent, shared world space for a plurality of objects and a plurality of clients is disclosed comprising: a plurality of microservices for maintaining a representation of a virtual world; a plurality of resolvers for routing traffic to the plurality of microservices based on a real-time load; a plurality of load balancers for creating a connection between a plurality of clients and the plurality of microservices, wherein the connection comprises the lowest latency and lowest load on a per-connection basis; a database for storing a status of each of a plurality of objects and each of the plurality of clients; and a global backplane for setting up and maintaining the connection between the plurality of clients and the plurality of microservices, and for transmitting messages between a plurality of service instances.

In this embodiment, the system can further comprise a plurality of microservices further receive and route a plurality of messages between the plurality of clients; wherein the plurality of messages comprises one or more instantiation messages; wherein the plurality of messages comprises one or more update messages; wherein the plurality of messages comprises one or more destruction messages; where the plurality of messages is dynamically allocated based on client and object proximity; wherein the plurality of microservices maintains a list of a plurality of connected clients and forwards the plurality of messages to the plurality of connected clients over the global backplane; wherein the plurality of microservices comprises a user management service, wherein the user management service implements support for stateful user information; wherein the plurality of microservices comprises an object prototype service, wherein the object prototype service provides object prototype and world object instantiation functionality; wherein the plurality of microservices comprises one or more multiplayer services wherein the one or more multiplayer services maintains the real-time state of users and objects by a geographic region and broadcasts location and state changes to one or more users and one or more objects in the geographic region; or wherein the plurality of microservices comprises a spatial data service, wherein the spatial data service comprises a plurality of cloud anchors for visual positioning and point of interest data.

In another example embodiment a method for enabling a massive persistent, shared world space for arbitrary numbers of simultaneous and asynchronous clients is disclosed, the method comprising: determining a position of a client; sharing the position of the client with a massively multiplayer online (MMO) system; using the position of the client to determine one or more digital objects and one or more other clients in the proximity of the client; adding the client to a virtual representation of the world; sharing the one or more digital objects and the one or more other clients with the client; maintaining a real-time relationship between the client and the one or more digital objects and the one or more other clients in the virtual representation of the world; and updating one or more applications of the client.

In another example embodiment a platform for a connected space is disclosed comprising: a point-of-interest system; a visual positioning system; a foundation; and a massively multiplayer online service comprising: a plurality of microservices for maintaining a representation of a virtual world; a plurality of resolvers for routing traffic to the plurality of microservices based on a real-time load; a plurality of load balancers for creating a connection between a plurality of clients and the plurality of microservices, wherein the connection comprises the lowest latency and lowest load on a per-connection basis; a database for storing a status of each of a plurality of objects and each of the plurality of clients; and a global backplane for setting up and maintaining the connection between the plurality of clients and the plurality of microservices, and for transmitting messages between a plurality of service instances.

In this embodiment, the platform can further comprise wherein the connected space comprises a virtual reality connected space; wherein the connected space comprises an augmented reality connected space; wherein the connected space comprises a mixed reality connected space; or wherein the connected space comprises an extended reality connected space.

In this embodiment, the system can further comprise: a plurality of microservices to receive and route a plurality of messages between the plurality of clients; wherein the plurality of messages comprises one or more instantiation messages; wherein the plurality of messages comprises one or more update messages; wherein the plurality of messages comprises one or more destruction messages; where the plurality of messages is dynamically allocated based on client and object proximity; wherein the plurality of microservices maintains a list of a plurality of connected clients and forwards the plurality of messages to the plurality of connected clients over the global backplane; wherein the plurality of microservices comprises a user management service, wherein the user management service implements support for stateful user information; wherein the plurality of microservices comprises an object prototype service, wherein the object prototype service provides object prototype and world object instantiation functionality; wherein the plurality of microservices comprises one or more multiplayer services wherein the one or more multiplayer services maintains the real-time state of users and objects by a geographic region and broadcasts location and state changes to one or more users and one or more objects in the geographic region; or wherein the plurality of microservices comprises a spatial data service, wherein the spatial data service comprises a plurality of cloud anchors for visual positioning and point of interest data.

Other objects, features, and advantages of the present invention will become apparent upon consideration of the following detailed description and the accompanying drawings.

DETAILED DESCRIPTION OF THE INVENTION

The following is a detailed description of embodiments to illustrate the principles of the invention. The embodiments are provided to illustrate aspects of the invention, but the invention is not limited to any embodiment. The scope of the invention encompasses numerous alternatives, modifications, and equivalents. The scope of the invention is limited only by the claims.

While numerous specific details are set forth in the following description to provide a thorough understanding of the invention, the invention may be practiced according to the claims without some or all of these specific details.

Various embodiments will be described in detail with reference to the accompanying drawings. Wherever possible, the same reference numbers are used throughout the drawings to refer to the same or like parts. References made to particular examples and implementations are for illustrative purposes and are not intended to limit the scope of the claims.

The disclosed invention is used to create a connected space. A connected space ("connected space") is any combination and/or augmentation of one or more physical worlds and/or digital worlds, to allow one or more individuals to participate in the resulting spatial experience. Whether physically co-located or geographically dispersed, the connected space can be singularly, continually, or periodically consumed by one or more users at the same time, during overlapping times, or at different times, either synchronously or asynchronously. This invention and disclosure provide a digitization of the places and objects in the physical world that will connect the physical and digital worlds and make a connected space accessible anywhere in real-time. Connected spaces are accessible collaboratively from personal computers, mobile phones, immersive devices, or other similar devices.

Platform 100 Overview

Figure 1:
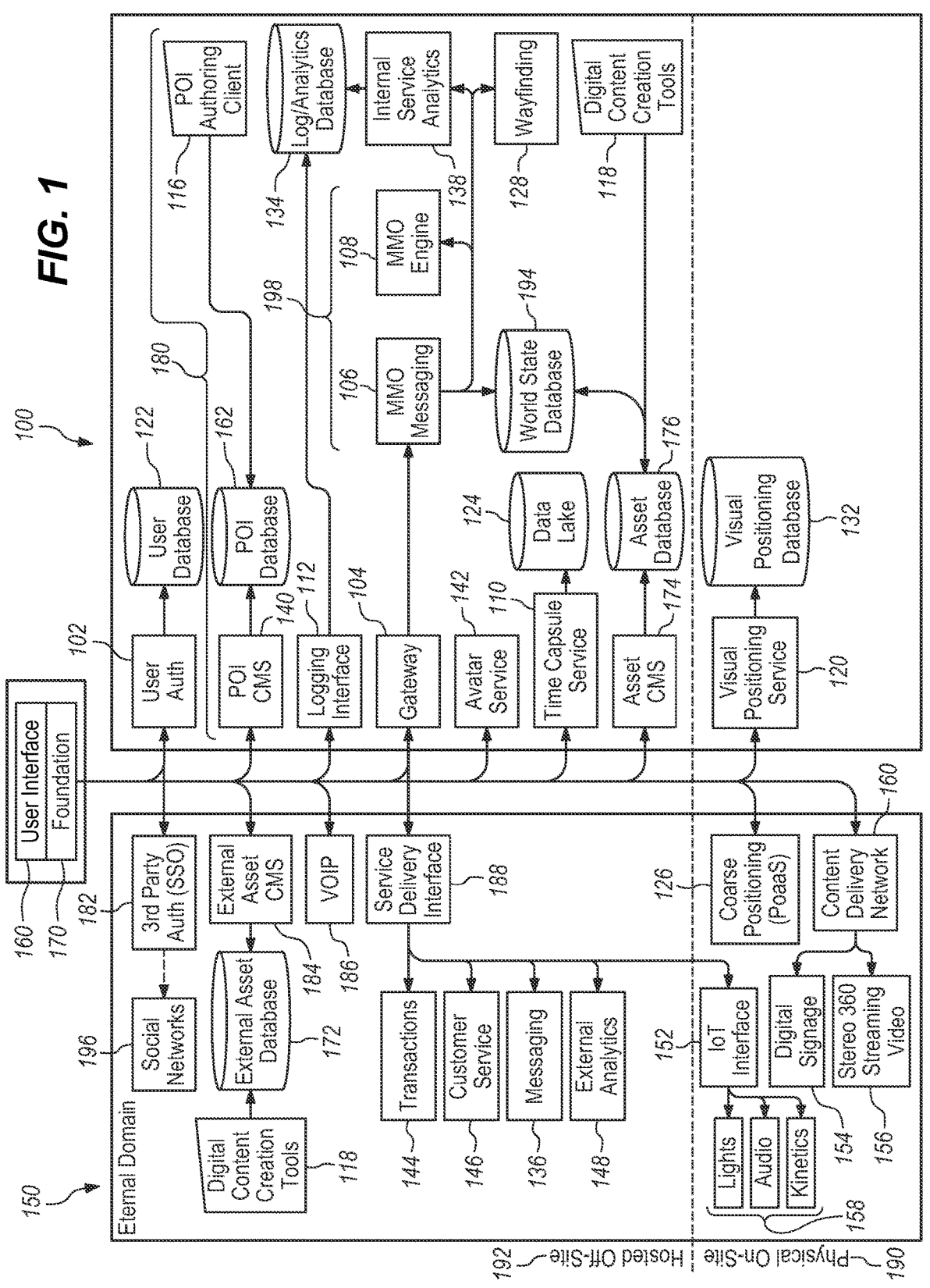
FIG. 1 illustrates a platform for coherently managing real-time user interactions between the virtual and physical items, character bots, and other human participants, whether in VR, AR, MR, or XR.

As shown in FIG. 1, Platform 100 according to the present invention is a technology platform that allows users to design, build, and operate a connected space that bridges physical and digital spaces. It powers XR experiences to be accessed by users anywhere in the world at any time. It allows multiple users to collaborate in the design and review process, such as when designing a real-world location of interest and simulated mission. Platform 100 can import a "digital twin" anchored in a real-world location with geo-contextualized data.

Platform 100 comprises a user authentication service 102, gateway 104, massively multiplayer online ("MMO") messaging 106, MMO engine 108, time capsule service 110, logging interface 112, Point-Of-Interest ("POI") system 180, avatar service 142, and Visual Position System ("VPS") 120. The Magnopus World Services Platform is an example of Platform 100. MMO services 198 comprises MMO engine 108 and MMO messaging 106. Internal analytics can be done by internal service analytics 138 using log analytics database 134.

In one example embodiment, Platform 100 allows visualization of assets and mission components as trainers design operational challenges for trainees. Platform 100 can publish and make available to operate the connected space, enabling end users to conduct activities (e.g., whether consumers engaging with experiences or enterprise users with operational activities) within Platform 100. It also can gather data from trainee performance in missions and easily adjust elements within the missions to create additional operational scenarios.

In another example, physical and digital visitors can be connected in a world filled with AI characters, AR experience activations (e.g., AR art activations), character interactions, experiences, and/or entertaining quests of discovery. A digital twin can be connected to the physical site such that the digital twin is accessible from around the world in VR and through devices such as desktops.

External services 150 are either located at physical on-site 190, which is the physical site of the visitors, or located at hosted offsite 192, such as a cloud environment. IoT infrastructure 158, coarse positioning 126, and digital signage 154 and audio/video streaming 156 are located at the physical on-site 190. In one embodiment, third party authentication service 182, external asset CMS 184, VOIP 186, and service delivery interface 188 are located at hosted offsite 192. In one embodiment, third party authentication service 182 is used to authenticate social networks 196. In another embodiment, service delivery interface 188 can be used for interaction with external services 150 such as transactions 144, messaging 136, customer service 146, and/or external analytics 148.

In one embodiment, external services 150 can be a smart environment that responds to visitors through user interface 160, which in various embodiments can comprise an AR and/or VR interface, mobile apps, web applications, desktops, kiosks, and other devices that respond to visitors.

The AR and social capabilities can connect to the IoT infrastructure 158 via IoT Interface 152 of external services 150. In one example, this is built on a 5G infrastructure. In one example, humans, avatars, and AI characters can interact. The people, characters, and even objects can interact. Interaction is non-linear, mirroring the real world. For remote visitors, PC or mobile applications, including VR, grant access to the connected space where the remote visitors can connect with the physical content and on-site visitors. VOIP 186 and content delivery network 160 can connect visitors in the physical world with those attending virtually via digital signage 154 and audio/video streaming 156.

Platform 100 provides cross-device flexibility, allowing access to the same connected space across multiple devices, including VR, desktop, mobile (2D and AR), and web. All updates to the core connected space are automatically updated for all devices.

Platform 100 allows real-time social and multiplayer interaction. Users can interact intuitively with other users with highly-naturalistic social mechanics.

Platform 100 implements the functionality necessary to create a digital twin of a physical location.

Platform 100 populates the location with digital elements including architectural geometry, virtual items, and automated characters via world state database 194 and avatar service 142. Platform 100 coherently manages real-time user interactions between the virtual and physical items, character bots, and other human participants, whether in VR, AR, MR, or XR. FIG. 1 details the relationship of these components in an example embodiment.

The user authentication service ("UAS") 102, user data base 122, and third-party authentication service 182 provides support for multi-tiered access to the services for a connected space and abstracts and extends the functionality of any underlying, full-featured User Access Management ("UAM") system. In addition to full user authentication and authorization, UAS 102 also allows anonymous and stateful, non-personally identifiable information ("PII") user access from user database 122. UAS 102 is responsible for granting tokens and managing access to the appropriate backend services for each tier of user. UAS 102 is able to automatically migrate user accounts from anonymous and non-PII accounts to full UAM accounts without additional user intervention.

Gateway 104 enables a transparent connection between user application requests and the appropriate backend services. Gateway 104 is responsible for automatically provisioning and deploying new services, scaling existing services, and removing unused services based on user demand. Through, for example, a uniform RESTful API, Gateway 104 implements reverse proxy, port redirection, load balancing, and elastic scaling functions. Gateway 104 provides a simple, deterministic interface for user access and resource management, masking the underlying complexity of the service architecture.

MMO messaging 106 is the robust data routing and communication layer for the broader set of services that are a collection of loosely coupled microservices. The microservice architecture provides several key advantages over a monolithic solution including ease of maintenance, extensibility, continuous deployability, abstraction of complexity, and scalability. However, in order to gain the advantages of a microservice solution, MMO messaging 106 implements a standalone, scalable message passing interface with a strictly defined, but abstract and simple, protocol for defining message sources, destinations, types, and payloads. MMO Messaging 106 can rapidly inspect message metadata and ensure all messages are delivered to the intended recipients. MMO messaging 106 is the nervous system of Platform 100.

MMO engine 108 is a collection of loosely coupled microservices 232 (FIG. 2) that enable a massive persistent, shared world space for arbitrary numbers of simultaneous and asynchronous users. MMO engine 108 utilizes multiplayer technology that governs seamless interactions between users. MMO engine 108 enables scaling up of users within Platform 100 and driving multiplayer interactions.

Figure 2:
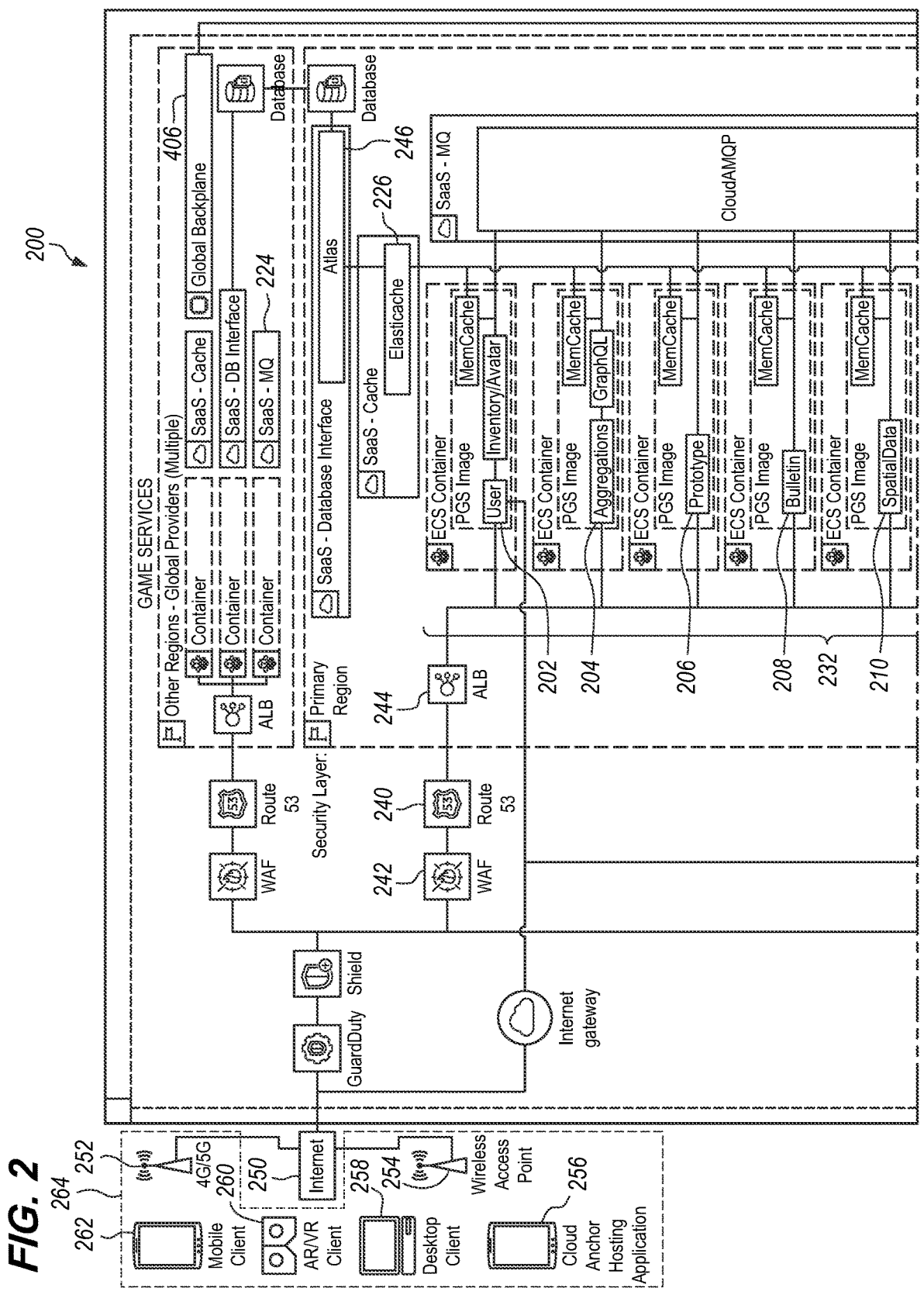
FIG. 2 shows an embodiment of a cloud hosted services system overview diagram.
Figure 2:
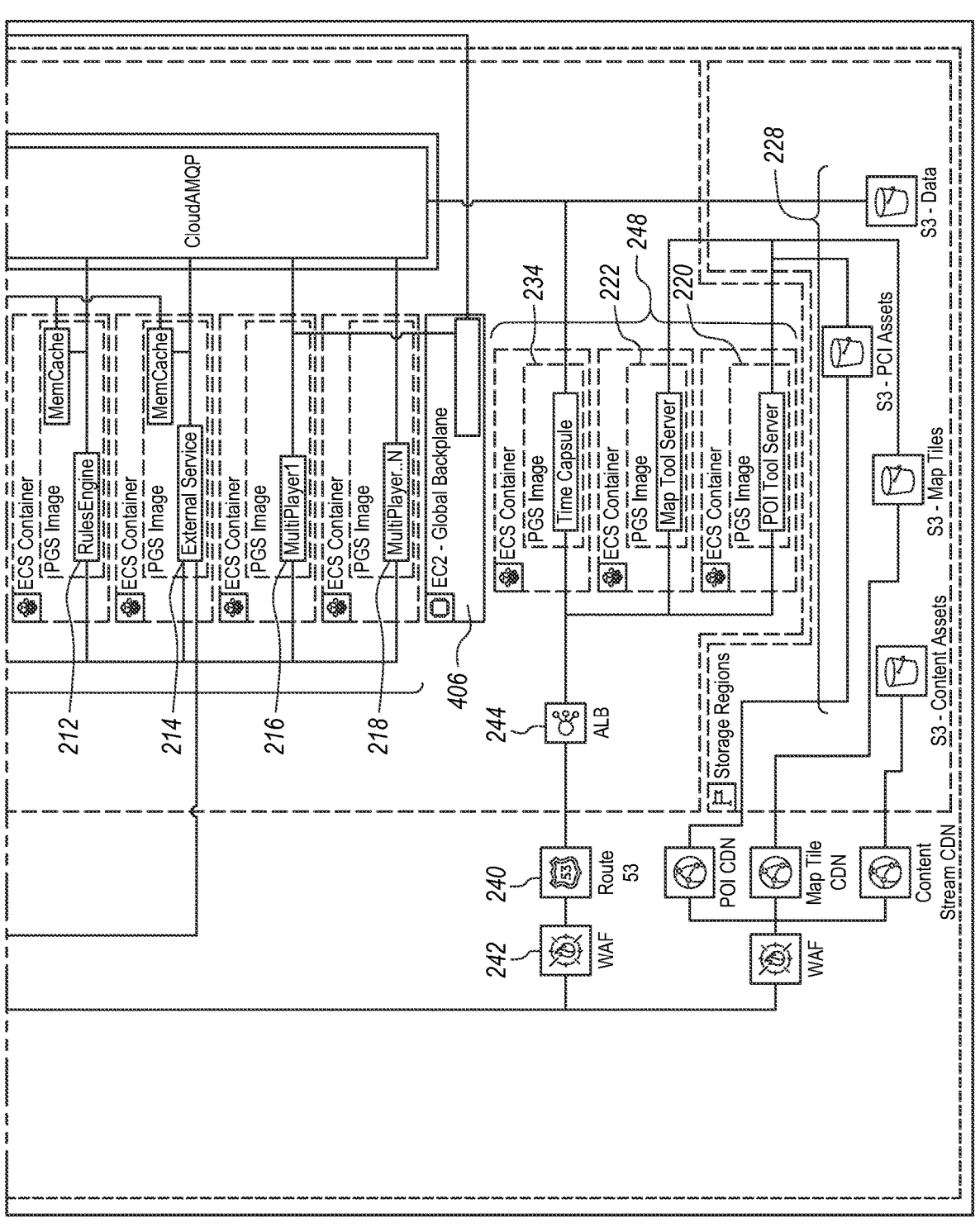

MMO engine 108 is extensible in order to support future requirements. MMO engine 108 comprises several core components including in one example embodiment as shown in FIG. 2 object prototype services 206, user management services 202, multiplayer services 216 and/or 218, and spatial data services 210. User management services 202 implements support for stateful user information such as inventory and history. Object prototype services 206 provides abstract, non-user object prototype and world object instantiation functionality. Multiplayer services 216 and/or 218 maintains the real-time state of users and objects by geographic region, and broadcasts location and state changes to all other users and objects in the region.

Through the collection of microservices 232, though users may enter and exit the world at will, the overall state of the world remains synchronous and persistent. In addition, client applications are able to request classes of world elements relevant to their function. For example, virtual reality applications would request all geometry in the world, but augmented reality applications would only need user and transient object geometry. MMO engine 108 provides the core components for maintaining a common, interactive world to all users.

Time capsules are a unique method of allowing participants to take away a tangible memento of their time in a connected space that is experienced in VR, AR, MR, or XR. Time capsules are graphical timelines of the users' journeys through the connected space, complete with personal pictures and text of the experience. The time capsule service 110 facilitates this by capturing, contextualizing, and storing the artifacts of an attendee's journey in data lake 124. Once the user leaves the connected space, the service generates a visual summary and presents it to the user so that they can continue to access and relive their journey.

Platform 100 further comprises POI authoring client 116 and digital content creation tools 118. The digital world is only engaging if it is populated with content. The world content is divided into two primary classes: Points of Interest and World Data. The system includes POI authoring client 116 and digital content creation tools 118 for creating each class of content.

In an example embodiment, the world space is stocked with real world points of interest, from artwork to architecturally significant structures, and from historically significant artifacts to culturally significant elements. POI authoring client 116 provides the interface to define these elements and their associated metadata. POI authoring client 116 is also a graphical map interface with user experience elements such as a button, check box, text box, or similar for adding, modifying, and deleting points of interest and individual metadata fields. The POI authoring client 116 manages the definition of locations for existing, network accessible metadata as well as the uploading of content to the POI database 162.

For world items that are not authored in the POI authoring client 116, the digital content creation tools 118 provides the interface for defining them. These items include items such as building geometry, landscape components, architectural detail, civil structures, digital signage, and site decoration. Digital content creation tools 118 allows authors to associate assets in asset store database 176 and external asset store database 172 with their positions in digital world space. The client also manages the uploading of digital assets to the asset store database 176 and external asset store database 172. The client includes a fully immersive interface for interacting with the total world space, such as in VR.

User interface 160 is the user-facing element of Platform 100, and it is the portal through which users interact with the world and other users. Through various presentation models including VR and AR on multiple devices such as mobile, desktop, and wired and standalone HMDs, users employ natural interactions using familiar interfaces such as 6 Degrees of Freedom ("DOF") controllers and thumbsticks. Since user interface 160 is the way general users experience this world, the usability and enjoyability of them is critical. User interface 160 is built on top of foundation 170, and communicating in real time and retrieving the world elements on demand from MMO engine 108 to aid in creating a seamless experience.

Platform 100 is an architecture that can support an extremely large and complex environment. Given that there is a finite capability in the devices running the end user applications, a world with infinite complexity would not be possible to represent. The client applications include renderer functions that work in conjunction with the backend services and visualization capabilities to present a convincing immersive experience for the user with the essential and relevant data and representations for that user.

Foundation 170 abstracts and unifies all the functionality necessary to provide a seamless, networked immersive user experience. It includes a developer interface to build the user experiences and the libraries to deploy the experiences to the user-facing applications. It coordinates the communication between the abstract backend world representation and the in-experience user-facing environment. Foundation 170 is the bridge between the world state and the human computer interface.

To provide a believable and effective augmented reality for users to collaborate within, concrete anchors to the absolute physical world coordinate space are used. Users must be able to see the same things in the same place at the same time, and experience the results of interactions as they occur. VPS 120 abstracts the generalized functionality and in an example embodiment, interfaces with third party systems. In addition, as systems evolve, and new approaches emerge, they can be easily integrated without need to rebuild the abstract interface.

Geo-contextualized data stored in VPS database 132 is incorporated by VPS 120. Content and experiences in connected spaces are mapped to real-world locations with high accuracy, such as centimeter-level accuracy. VPS 120 streams in relevant data feeds like IoT devices or other equipment and sensors to create additional contextually relevant experiences within the connected space.

POI system 180 comprises POI CMS 140, POI Authoring Client 116, and POI database 162 and allows Platform 100 to place content and experiences within a "map" of the digital twin. Storing temporal information for objects improves network bandwidth and reduces the required resources because, unlike GIS systems, an object is only displayed when the time is correct. For example, sunset is not displayed midday and should not look exactly the same every day, and fireworks can be reserved for holidays and can vary across years and/or locations.

Foundation 170 provides the capabilities for Platform 100 to be game-engine agnostic. In an example embodiment, Unity and Unreal plugins allow developers to use either engine and still collaborate with users in the other engine. This device-agnostic approach accommodates collaboration across different projects, teams, and partner workflows into the same platform.

In one example embodiment, the system architecture includes a 5G network and Wi-Fi access points to PoP connections via service delivery interface 188 and gateway 104 to hosted off-site services 192; visitor positioning via VPS 120, course positioning 126, and wayfinding 128; mobile to IoT systems integration via IoT interface 152; site-wide integrated display via VOW 186 and content delivery network 160 comprising digital signage 154 and audio/video streaming 156; digital twin capability via world state database 194 and avatar service 142; external asset CMS 184, external asset database 172, POI CMS 140, POI database 162, asset CMS 174, and asset database 176 for bridging AR and VR users; large scale cross-platform communication via gateway 104 and user interface 160; and MMO engine 108 for visitor experience.

Cloud Hosted Services System 200

FIG. 2 shows cloud hosted services ("CHS") system 200. In one embodiment, CHS system 200 is hosted on Amazon Web Services, but in other embodiments, may be adapted to most modern cloud service providers. CHS system 200 comprises multiple, loosely coupled microservices 232.

In one embodiment, these microservices 232 comprise user management services 202, service aggregations 204, object prototype services 206, notification bulletin 208, spatial data services 210, rules engine 212, external service 214, and multiplayer services 216 and 218. In one embodiment, the spatial data services 210 comprises cloud anchors for visual positioning and POI data. Microservices 232 are containerized and scalability is managed through a container service, such as in one example embodiment the AWS Elastic Container Service ("ECS").

Also hosted within CHS system 200 are management and operational tools 248 comprising a POI tool service 220, user tracking map tool service 222, and time capsule tool service 234.

In one embodiment, for efficient internal communication, CHS system 200 relies on SaaS solutions, such as in one embodiment RabbitMQ 224 for non-real-time services and a global cluster 226 for real-time, low latency services. Persistent data is stored in data storage components 228. Caching is facilitated through global cluster 226, such as a Redis cluster. Management and operational tools 248 are also containerized and scalability is managed through a container service, such as in one example embodiment the AWS ECS.

Load balancers 244, WAF 242 and resolvers 240 route traffic to microservices 232 and management and operational tools 248 based on a real-time load of microservices 232 and management and operational tools 248.

In one example embodiment, the load on each of the microservices 232 is measured, and if the load is high enough, then another instance of the specific microservice 232, such as user management services 202, is started and load is balanced across all instances. Messages are forwarded through global backplane 406, which is connected to multiplayer services 216 and/or 218.

Microservices 232 interface with database 246, such as a MongoDB Atlas in one embodiment, and management and operational tools 248 with data storage components 228 for record management and data references. User-facing data is stored in data storage components 228 separately from system logic. This allows for more efficient storage and delivery of data through a content delivery network while maintaining the flexibility of a referential, decoupled logic layer. Data can be updated and versioned independently of the referring logic.

Service REST and Web Socket interfaces are available to Internet-connected clients through load balancer 244. Non-real-time services support stateless REST interfaces for user management services 202, service aggregations 204, object prototype services 206, spatial data service 210, rules engine 212, and external service 214. Real-time, low latency services support stateful Web Socket and SignalR interfaces for notification bulletin 208 and multiplayer services 216 and 218.

External clients 264 may include mobile 262, web desktop 258, AR/VR/MR/XR 260, and cloud anchor hosting applications 256. The only requirement for using CHS system 200 is an Internet connection 250, which can be through wired, wireless 254, or mobile 4G/5G/nG networks 252.

In various embodiments, CHS system 200 may be deployed in any of a shared tenancy, dedicated, or on-premises model. CHS system 200 may also be directly connected to external sites and networks, such as in one embodiment through AWS Direct Connect. CHS system 200 may also optionally be integrated with external SaaS solutions, such as Google Cloud Anchors or Google Firebase.
MMO System 300

Figure 3:
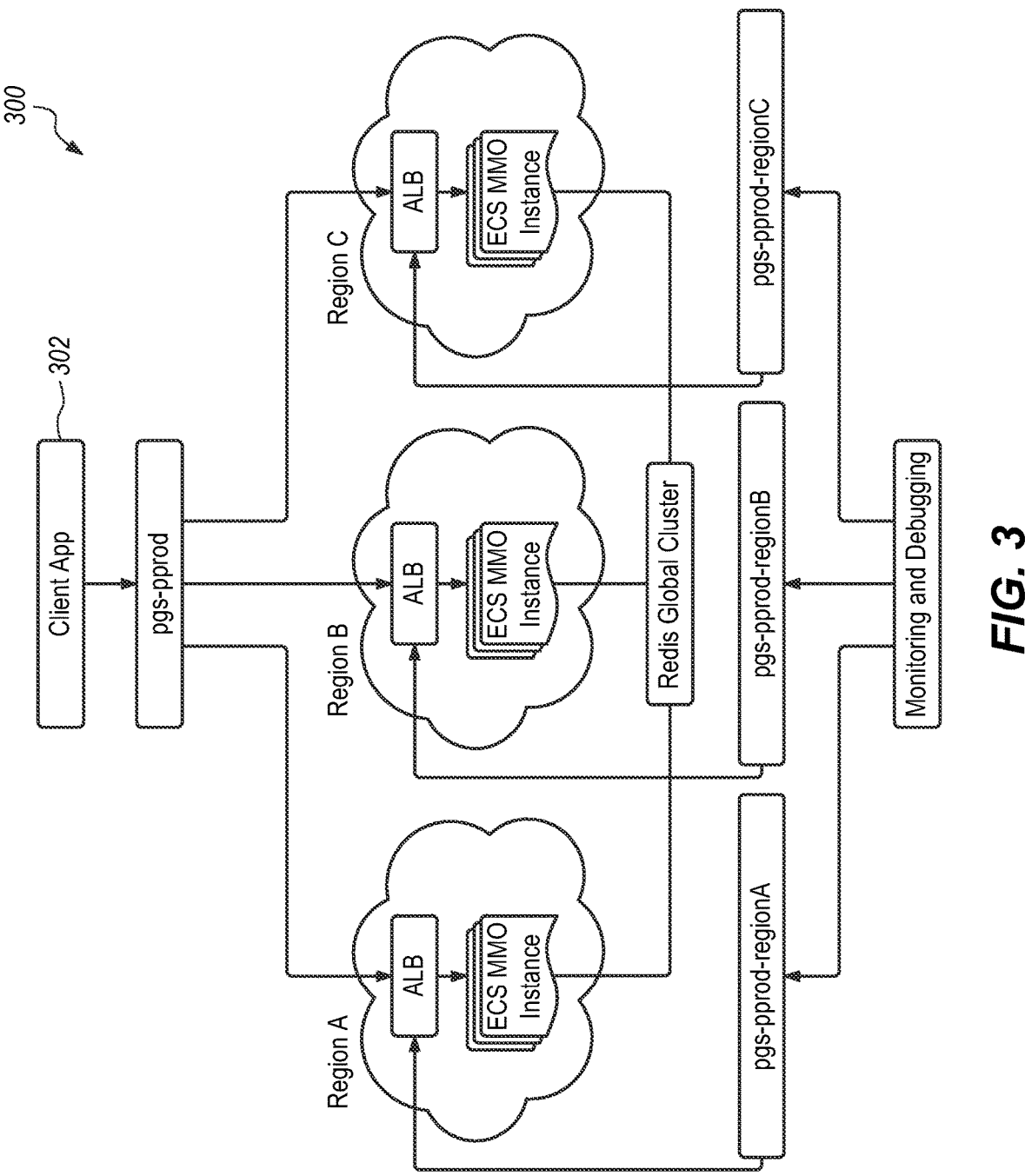
FIG. 3 shows an embodiment of a block diagram for the MMO system.
Figure 4:
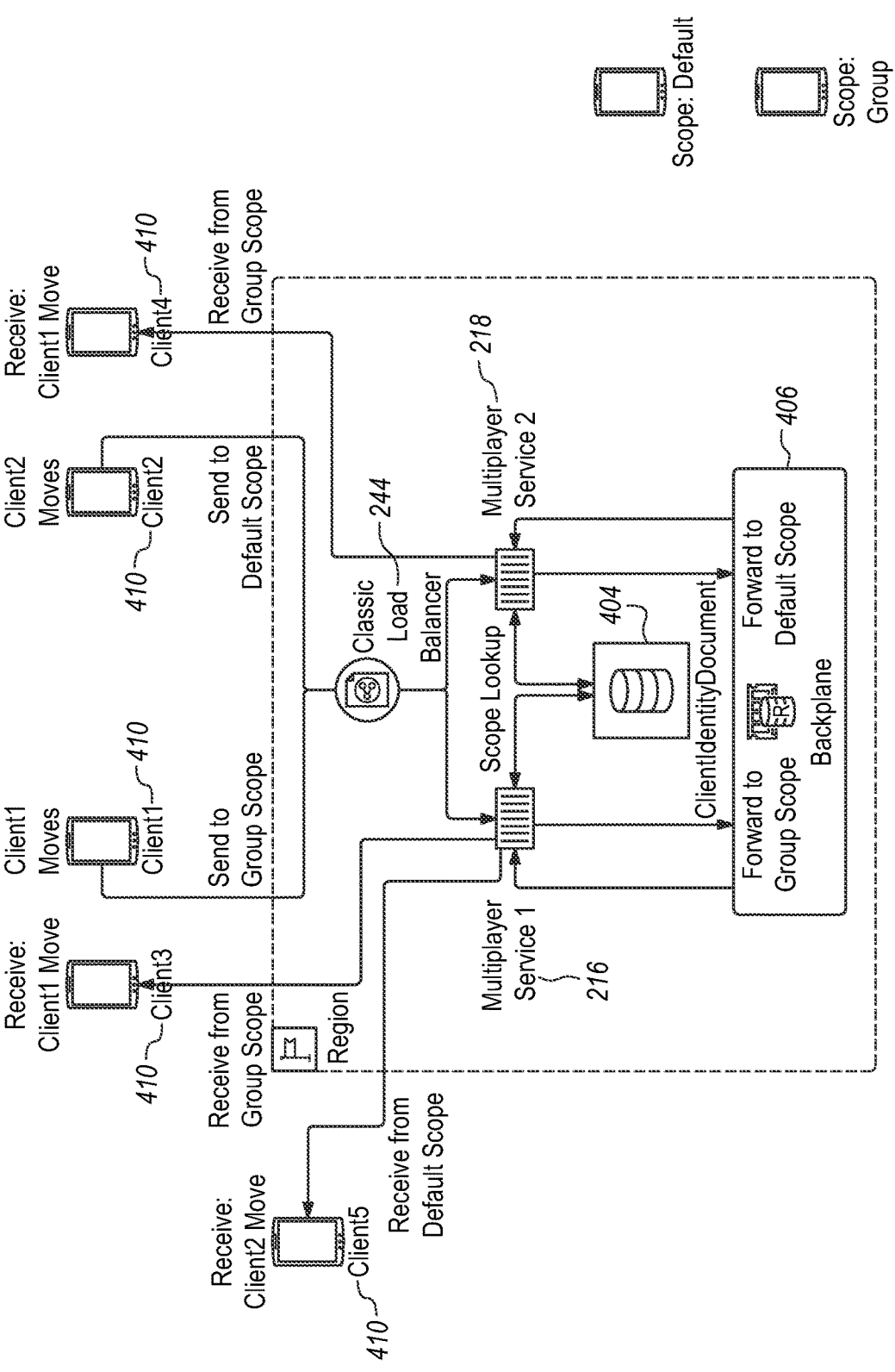
FIG. 4 shows an embodiment of MMO message segregation and delivery.

Turning to FIGS. 3 and 4, MMO system 300 is shown. MMO system 300 is a collection of loosely coupled micro-services 232, many of which reside in CHS system 200, that enable a massive persistent, shared world space for arbitrary numbers of simultaneous and asynchronous users.

MMO system 300 comprises resolvers 240 (FIG. 2), load balancers 244, database 404, global backplane 406, and microservices 232 (FIG. 2). As shown in FIG. 2, in one embodiment, microservices 232 comprise user management 202, service aggregations 204, object prototype 206, notification bulletin 208, spatial data 210, rules engine 212, external service 214, and multiplayer service 216 and 218.

The load balancers 244 transparently connect clients 410 to microservices 232 with the lowest latency and load on a per-connection basis. This allows MMO system 300 to scale in and out in response to fluctuating load.

Microservices 232 maintain the representation of the virtual world including the dispositions of all the objects and users in the current instance of the world. Microservices 232 persist the current object and user statuses in the database 404. Microservices 232 also receive and route user and object instantiation, update (patch), and destruction messages. Message routes are dynamically allocated (scoped) based on user-to-user and user-to-object proximity, as well as arbitrary developer-defined rules. When messages are destined for users that are connected to instances other than the receiving instance, whether in the same cloud region or another global region, the messages are forwarded through global backplane 406. MMO system 300 maintains a list of connected users, and only forwards messages over global backplane 406 when required.

Client application 302 is responsible for setting up and maintaining the connection to CHS system 200 and for transmitting messages between client application 302 and MMO system 300.
Cross Modality Coordination In order to accommodate movement, the full instances of a game world are hosted across clusters of autoscaling servers with geographic proximity to the player, so reloads are not necessary when traveling across regions. Communication between two players on the same server uses standard methodologies to deliver a low latency solution.

However, when two players are on separate servers in a geographically similar region, messages are sent to global backplane 406 and forwarded to the destination server. More geographically disparate user messaging runs from backplane to backplane until it reaches the destination service instance. These messages are purposefully abstract to allow for a wide variety of potential message functions.

Figure 5:
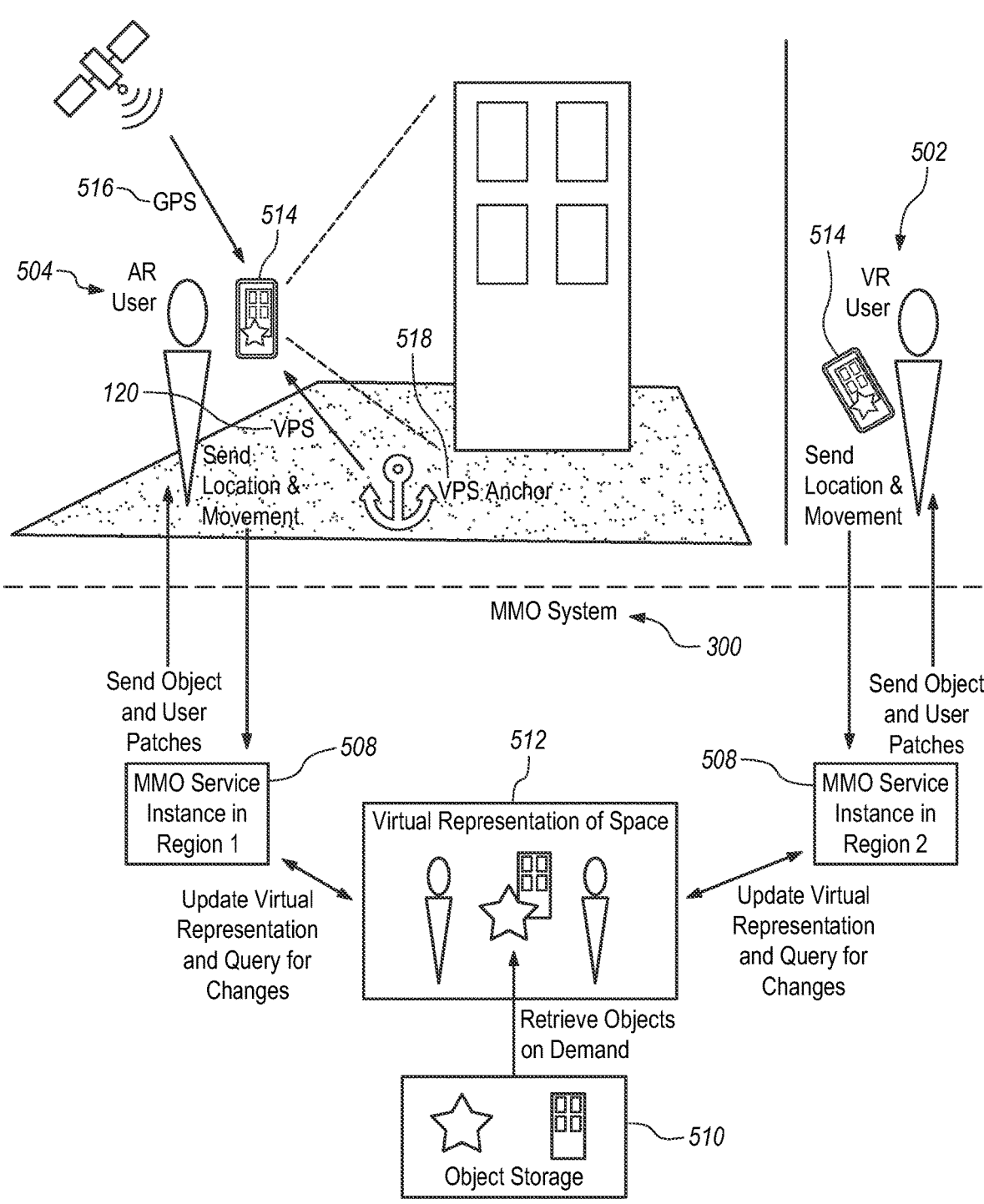
FIG. 5 shows an embodiment of cross-modality scene coordination for the MMO system.

As shown in FIG. 5, MMO system 300 enables disparate users to interact with one another and content as if they were co-located. Either user can be at the geographic location, but this is not required. As shown in FIG. 5, users at the physical location may interact using either AR client 504 or VR client 502. Remote users must use VR client 502. All of the underlying digital data is authored and managed through POI system 180. MMO system 300 manages the real-time interactions between users and objects by connecting the users to the data storage components 228.

For users at the physical location, the initial step of the process involves re-localization or the determination of the physical location and orientation of the user's device. VPS 120 is responsible for re-localization and uses a combination of AR SLaM, GPS 516, compass, inertial measurement, and computer vision spatial anchor methods, such as VPS anchor 518. VPS anchor 518 is a collection of artifacts that can be used to re-localize, or find the relationship between the physical location and orientation of the device camera as relates to the virtual world.

VPS 120 seamlessly moves between the solvers based on what is available, meaning VPS 120 seamlessly moves between the different localization modalities based on what is accessible at any given moment. Each method provides varying degrees of precision, processing requirements, and latency.

Once the user's geographic position is found, the position is shared with MMO system 300 via MMO service instance 508. MMO system 300 uses the shared position to lookup digital objects and other users in the proximity and viewport of the user stored in object storage 510. The user is then added to the virtual representation of the space 512. Once the user is added, MMO system 300 shares relevant objects and users with the newly added user via AR client 504 or VR client 502. The user's device 514 is responsible for rendering the digital items in relation to the user's immediate field of view. Finally, MMO system 300 synchronously maintains the real-time relationships between all the items in the virtual representation and updates the client applications accordingly.

User movements and user interactions with digital objects are immediately broadcast to all other proximate connected users. If a user on one device interacts with an active digital object, all other users will see the user manipulating the object. If a user walks either physically or virtually to another place in the location, the other users will see the user walk to the new location.

MMO system 300 is able to differentiate between AR clients 504 and VR clients 502. This allows MMO system 300 to share just digital objects and users to the AR clients 504, but the full set of digital "twin" components (models of the built environment) as well as digital objects and users to the VR clients 502.

Messaging

MMO system 300 further comprises a scalable, client-agnostic backend infrastructure that handles users across regions in a virtual world, provides the endpoints and pathways that allow users to communicate through a series of predefined predicates, and clusters user groups to allow for consistency of view for physical users and virtual users. While the MMO system 300 enables a large amount of functionality traditionally found in MMOs such as user accounts and items, these services are not a part of the MMO engine 108 itself. Instead, an author is provided with several contract packages and libraries that allow them to create a message system seamlessly given a prerequisite knowledge of the server locations and possible message structures.

Messages may only contain a subset of the total data, but always relay the new absolute value rather than a delta to correct for missed messages. If messages are missing pre-requisite data, both the server and player instances can query each other to self-heal.

All of these messaging features exist across a complex network of servers that auto-scale and balance to accommodate varying user load internationally, and yet from a user perspective, the process is entirely hidden. Therein, a single endpoint automatically determines and assigns the appropriate server without input from the player.

MMO messaging 106 allows authors to define objects and components and to define which components are within each object. Additionally, the MMO messaging 106 allows for three types of flexible messages to update the states of various components: object patches, object messages, and event messages.

Figure 6:
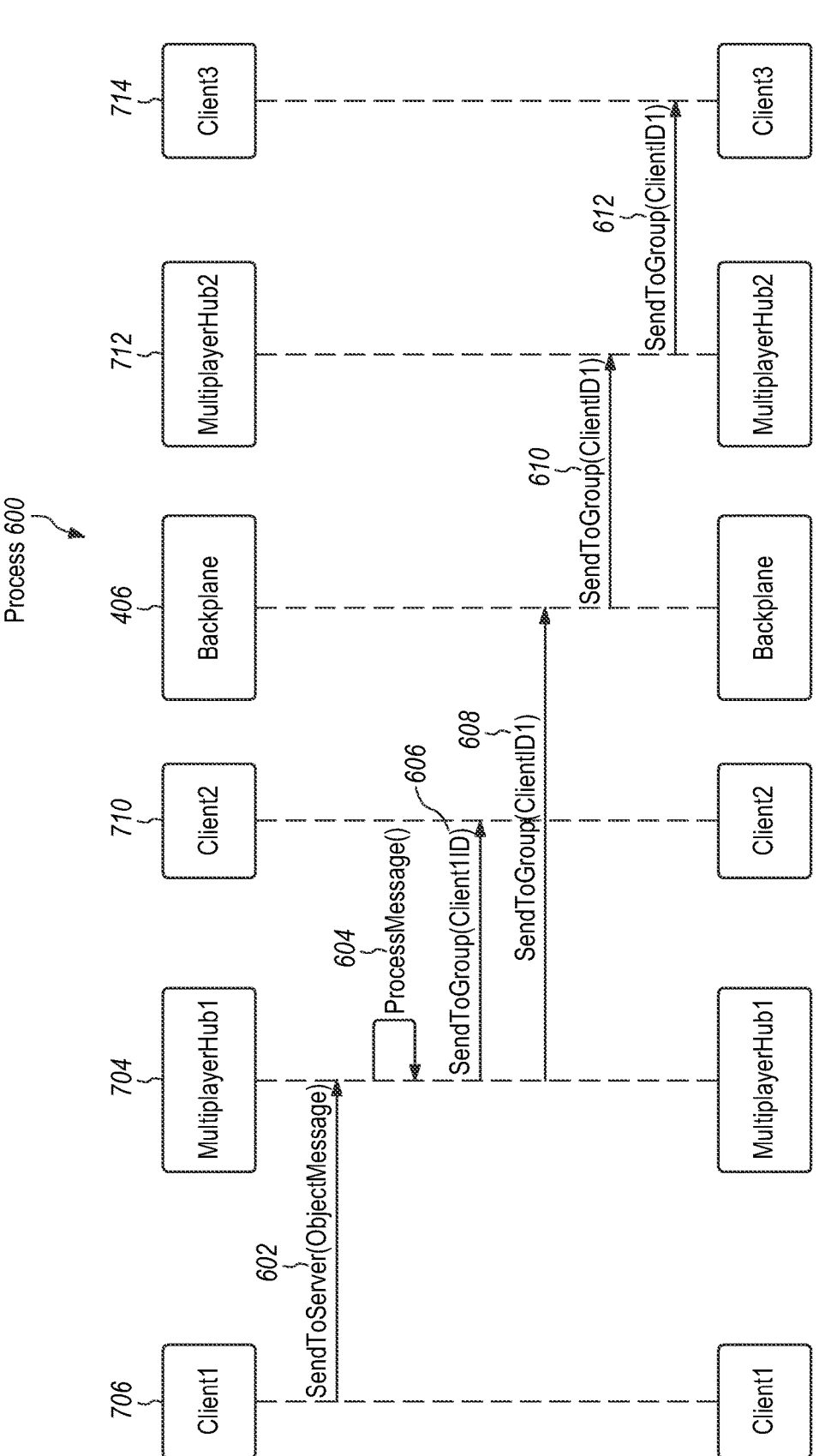
FIG. 6 illustrates an embodiment of a process of sending messages to direct connection clients and via a global backplane.
Figure 7:
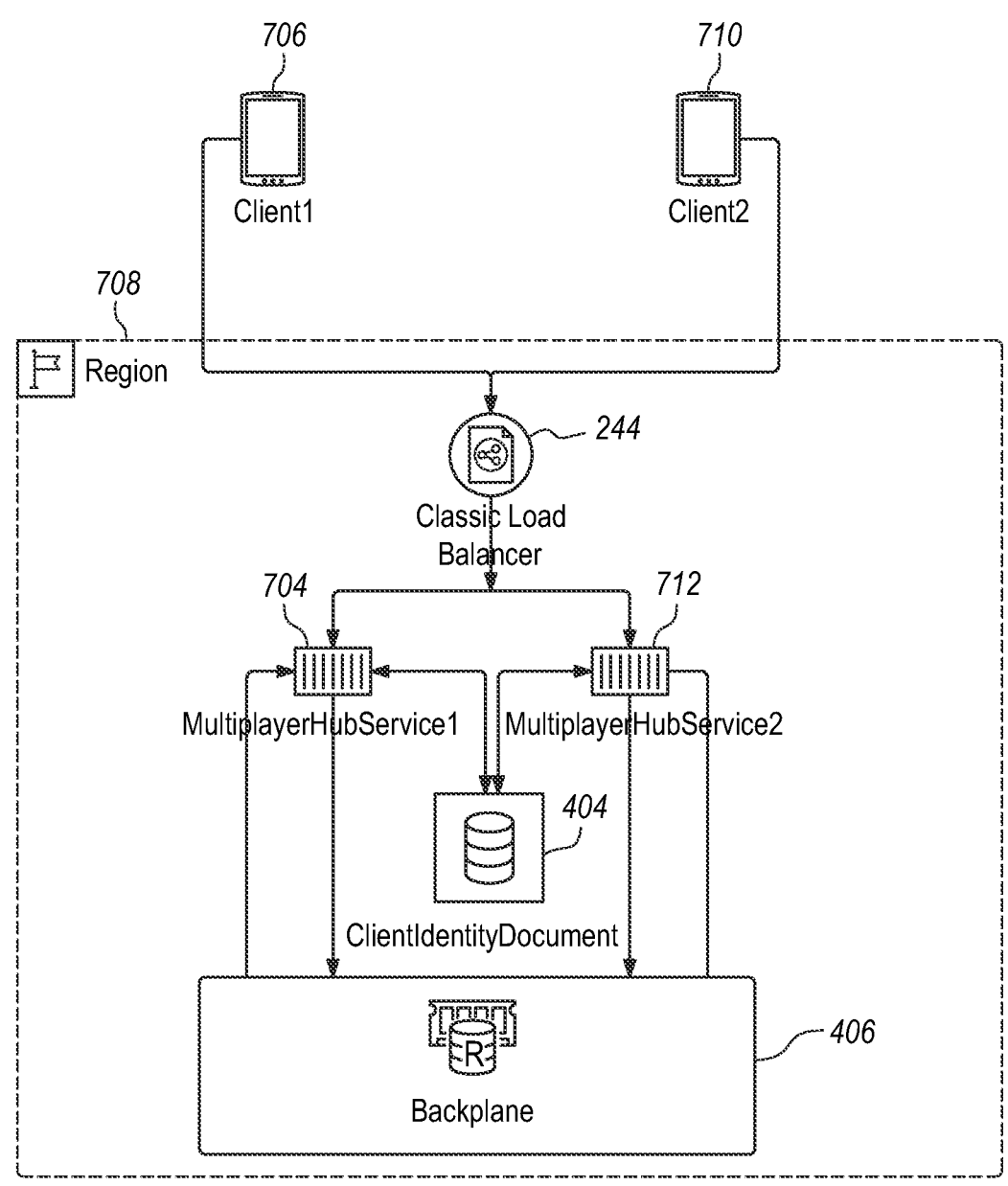
FIG. 7 illustrates an embodiment of communication with users subscribed to one another on different servers.
Figure 8:
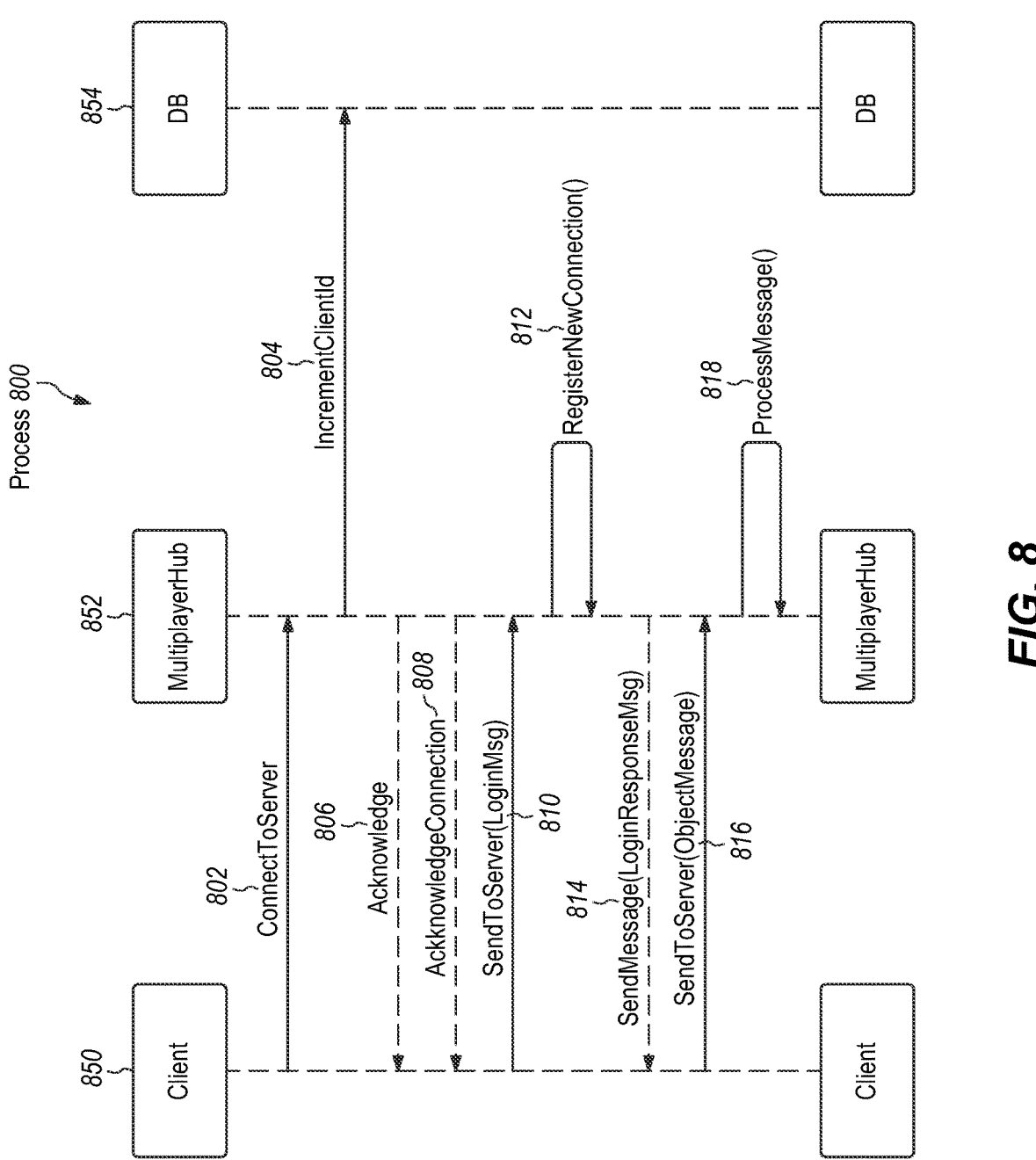
FIG. 8 shows an embodiment of a process of communication connection flow between a client and a multiplayer hub.

FIGS. 6-8 illustrate various embodiments of messaging between users. A simple game with relatively co-located players may have several game instances residing on the same server. For sufficiently populated games, the multi-player services on the backend exist in multiple instances hosted on any one of many physical servers.

As illustrated in FIGS. 6 and 7, users on the same server can communicate directly and via the global backplane 406 via communication process 600. First, at step 602, a first client 706 sends a message to the connected first multiplayer hub 704. At step 604, the first multiplayer hub 704 processes the message. At step 606, the first multiplayer hub 704 sends the message to a second client 710. At step 608, the first multiplayer hub 704 also sends the message to the global backplane 406. At step 610, the global backplane 406 sends the message to a second multiplayer hub 712. Finally, at step 612, the second multiplayer hub 712 sends the message to a third client 714 on the second multiplayer hub 712.

Turning to FIG. 7, global backplane 406 allows messages to be communicated to clients 706 of disparate servers. All of these servers connect to a distributed system of global cache servers. The instances of the service are connected to multiple instances of the global backplane 406 in a many-to-many relationship. Global backplane 406 is aware of which multiplayer instances contain users within the same scope.

For example, first client 706 and second client 710 who are both in Region 708 would likely be connected to the same global backplane 406. Therefore, messages from the first client 706 would be sent to a global backplane 406 and forwarded to the second client 710.

Additionally, if third client 714 (FIG. 6) in a different region than Region 708 wishes to play with the previous two users, messages would be sent from global backplane 406 to a backplane in the different region and then forwarded onto the service instance and finally to third client 714. This allows a user to always be connected to the same instance while messages are moved geographically significant distances from backplane to backplane. However, if there are no relevant users within a certain scope on the multiplayer instance are in that region, then global backplane 406 would know to ignore that server for a particular message.

FIG. 8 illustrates communication connection flow process 800 between a client 850 and a multiplayer hub 852, such as in one embodiment first multiplayer hub 704 or second multiplayer hub 712. First, at step 802, a client 850 connects to the multiplayer hub 852. At step 804, multiplayer hub 852 confirms the client 850 in the database 854. At step 806 and step 808, multiplayer hub 852 acknowledges the client 850 and connection to the client 850. At step 810, the client 852 sends a login message to the multiplayer hub 852. At step 812, the multiplayer hub 852 registers the client 850, and at step 814 the multiplayer hub 852 sends a login response message to the client 850. At step 816, the client 850 sends an object message to the multiplayer hub 852. And, at step 818, the multiplayer hub 852 processes the object message.

Whenever one of the components within an object changes, only the changed component needs to be communicated to update the object as a whole via communication connection flow process 800. As a result, client 850 can have fairly large objects, but only communicate the pieces of each object that have changed over time as they change. This communication is done through an object patch that can contain updates to one or more component values of a particular object. An avatar object, for example, may contain a position, rotation, elbow, forearm, and hand, but to move the hand, only the new absolute value of the hand's position needs to be communicated. This patch goes to the pertinent server, updates the object in its memory to create a new absolute state for the whole object. The same patch is sent to all of the other clients within the originating messenger's scope, and their client app updates the state of that object. The entire state of an object can also be communicated through an object message. This is important when objects are missing from a client's memory or server's memory. If a client or server receives a patch for an unknown object, the client or server can request a full object message for that patch, allowing the system to self-heal.

Event messaging, is a combination of an object patch and an object message, which is useful to provide a large number of consecutive updates while preserving the current state. An example event might be a dance emote, where an object's components are updated several times to display a complex motion and then returned to their initial state for a user or all those within scope for a user. Rather than sending all of those updates individually, the event message allows the intention to be communicated as a single message. While these examples allow for simpler understanding, the concepts themselves are abstract to allow for greater flexibility of the messaging system.

Scope defines who receives which messages. These scopes are developer-defined and can be based on any number of factors. For example, a scope may be a friend group that users opt into. It could also be based on in-game proximity or enrollment in an event. A user can be a part of multiple scopes at any one time, and therefore can receive messages from any number of different contexts.

User Sequences

The communication network allows a user to have a single world if desired. A user's server is decoupled from which instance they might find themselves. Therefore, all users can exist in the same world, or there can be several instances of the same world that are not determined by geographical location or server.

All of these service instances reside within containers. As the CPU usage increases above a certain threshold, a new instance is created within the same region and that new instance connects to the same global backplane joining it to the system. As new users create new connections within the backend they are routed to the new instance to balance the load. In the same sense, if a region has a sudden drop off of users, causing the CPU usage of a particular server to drop, that server may be spun back down and any remaining users would be migrated to a running server.

While MMO system 300 is complex, the user experience is simple. A single endpoint allows all users to join the game, and they are automatically assigned to the most appropriate server without input from the user. This seamless experience preserves the magic of a massive, international XR event for users around the world, including on-site and off-site users.

The system supports queued persistent storage of real-time objects. The system uses a server-side, radius-based area of interest management of real-time objects.

MMO system 300 facilitates the communication of user interactions between instances of an application. User actions on one instance of the application are broadcast in near real-time to users on other instances of the application through MMO system 300. The routing of these messages is managed by group subscriptions. Users that are subscribed to the same group will receive all subscribed users' event messages as they are generated. Users that do not share a subscription will not share messages. Users may be subscribed to multiple groups. An important function of MMO system 300 is to share user position updates so that users may see one another while using the application.

When operating at scale, it will be impractical and inefficient for all users to be subscribed to the same group. This is impractical because the volume of messages at scale would overwhelm available resources. This is also inefficient because users that are not near one another do not need to receive updates. Position changes would be superfluous. The solution is an Area of Interest (AOI) filter that fluidly updates user group subscriptions by proximity in response to user actions and movements.

AOI filter generates a connection list of users within a given radius of the user. In a continuous implementation, with a many-to-many relationship, the solution has an $O(n^2)$ complexity and would be computationally prohibitive at scale. However, the complexity is reduced by implementing a solution that only responds to periodic proximity altering, or triggering, events and generates relationship patches only for the affected users.

Figure 9:
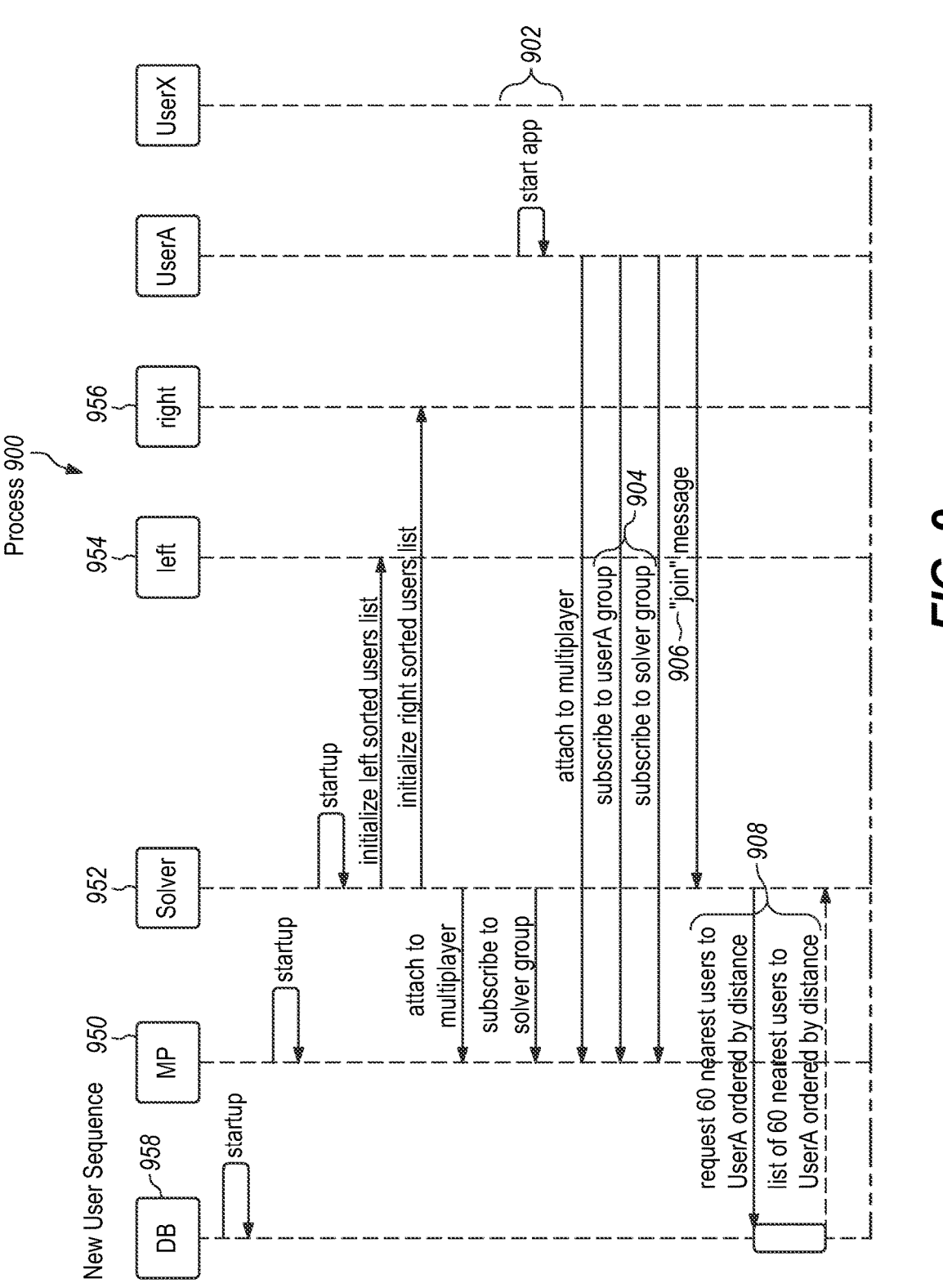
FIG. 9 illustrates an embodiment of a New User Sequence process for the MMO system.
Figure 9:
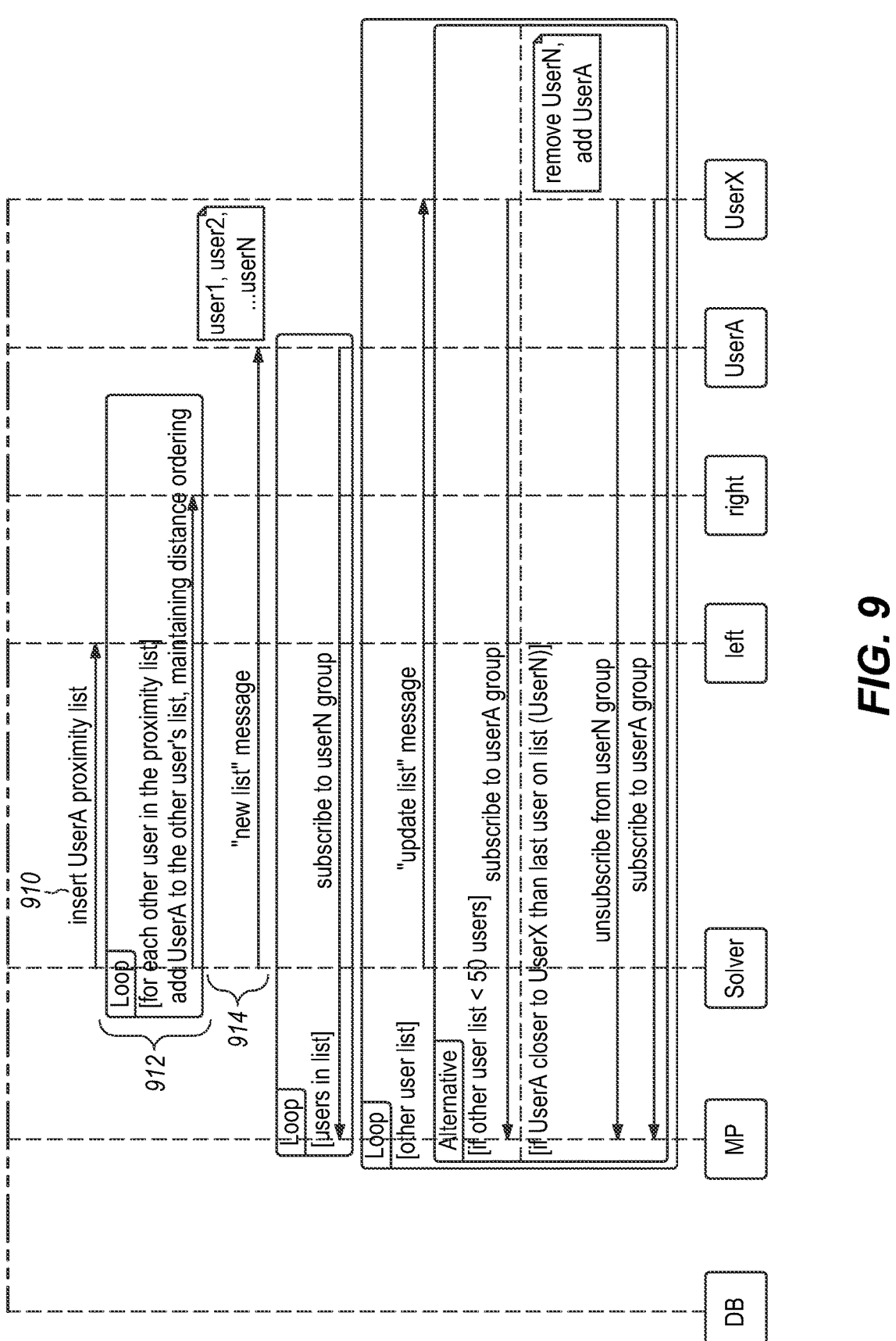
Figure 10:
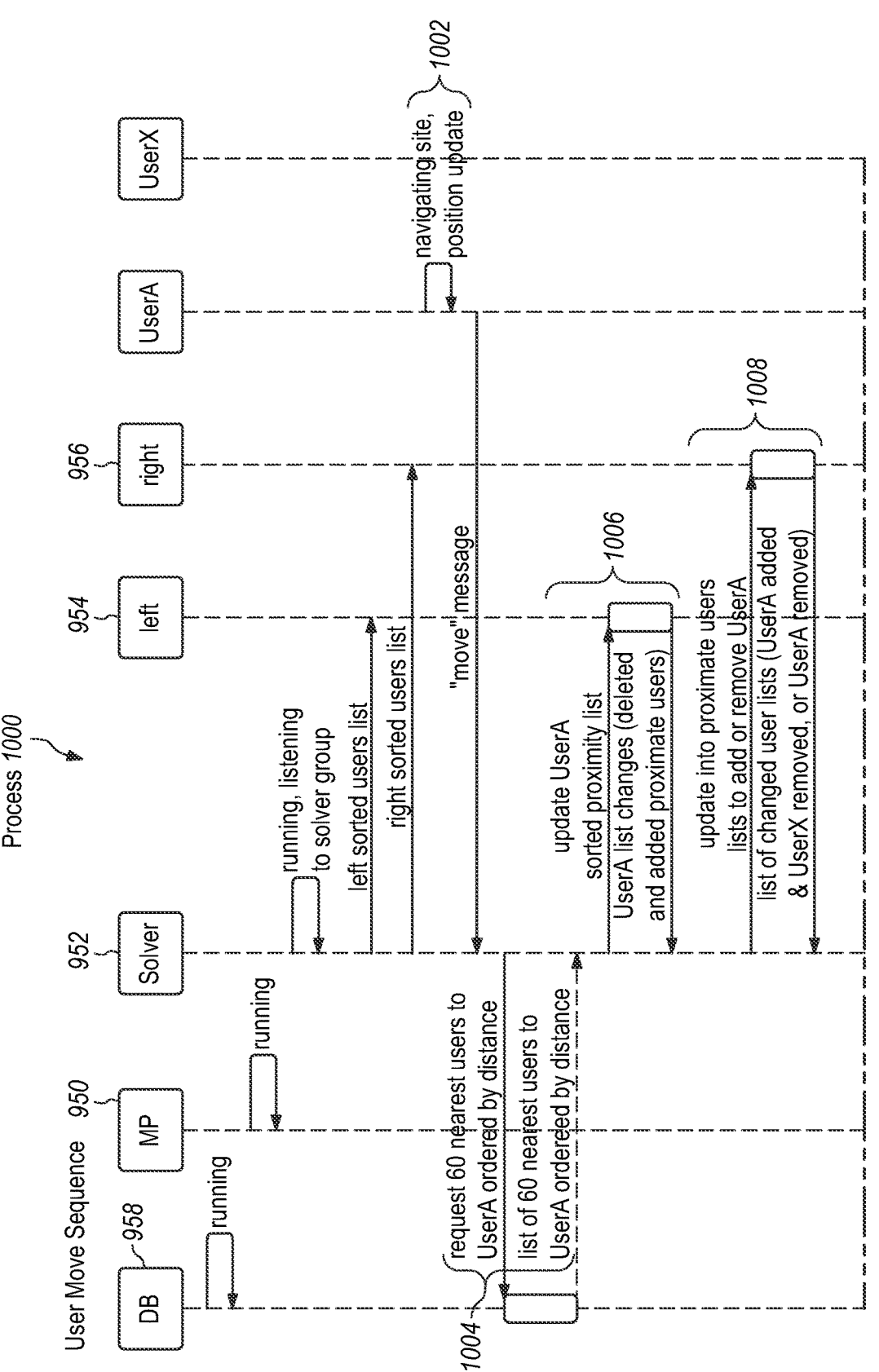
FIG. 10 illustrates an embodiment of a User Move Sequence process for the MMO system.
Figure 11:
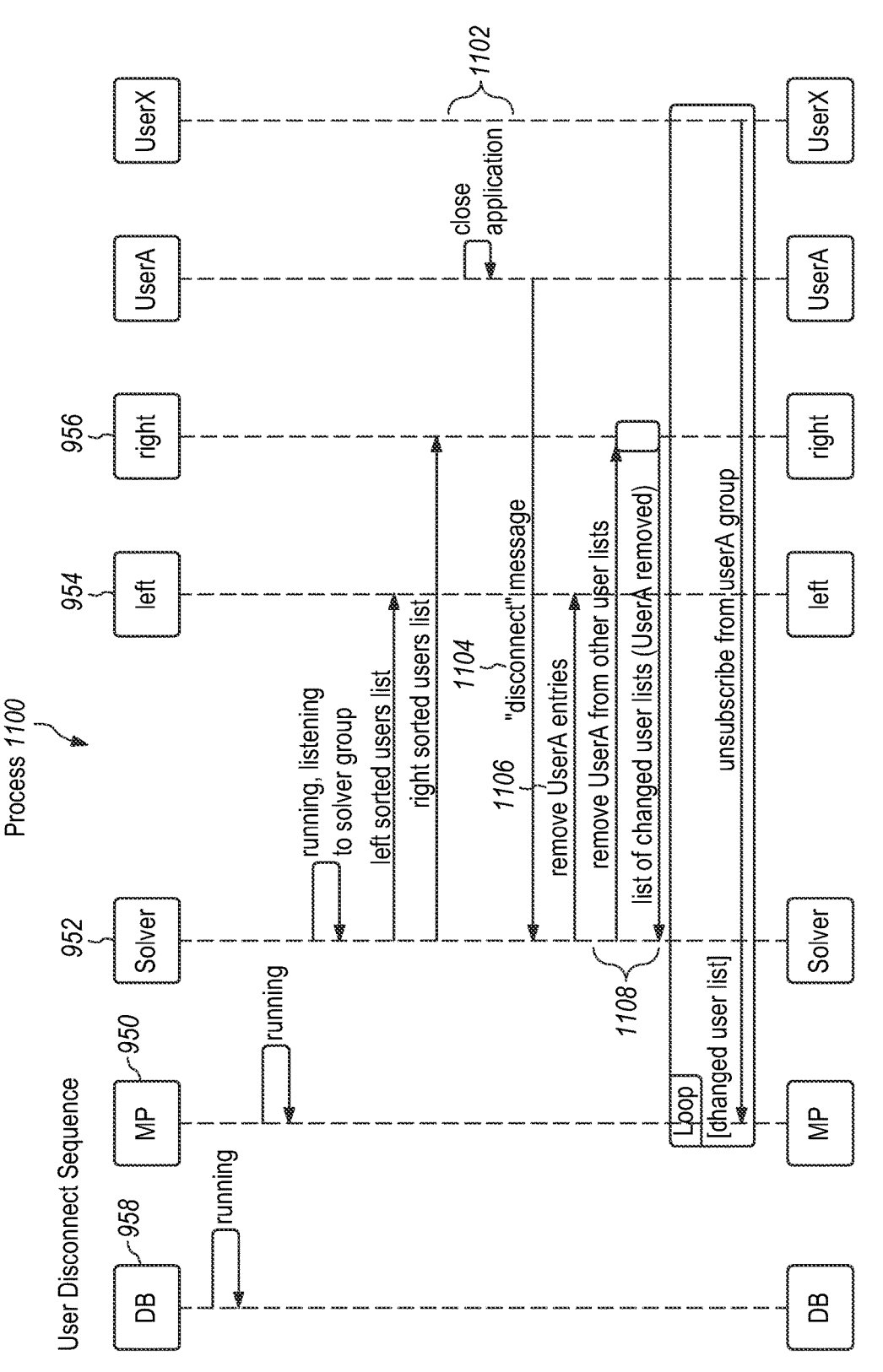
FIG. 11 illustrates an embodiment of a User Disconnect Sequence process for the MMO system.

In one embodiment, as shown in FIGS. 9-11, AOI filter is implemented as an out-of-band solver 952 that listens for triggering events, generates solutions for the users affected by the events, and notifies the multiplayer service so that it can modify subscriptions between users. The set of periodic triggering events may include events such as user join, user move, and/or user disconnect. These events are generated by the user and shared with the solver 952. FIGS. 9-11 show message sequence process embodiments for these example events.

FIG. 9 illustrates a New User Sequence process 900 for MMO system 300. At step 902, when a user joins the multiplayer hub 950, such as in one embodiment first multiplayer hub 704 or second multiplayer hub 712, they connect to the MMO system 300. At step 904, the solver 952 searches for other users that are spatially and logically connected to the joining user for the user to subscribe. Logical connections might include membership in common spaces or social groups. The solver 952 creates a connection between the returned users and the joining user until the number of allowed connections is reached.

At step 906, the user generates a join message. Next, at step 908, the solver 952 receives the join message and looks up a limited list of users in the database 958 within a given radius of the new user. The limited list is a small amount greater than the desired number of users visible to any user in order to facilitate the sorting and comparison necessary to alter the lists. The amount is programmatically determined by the applications at runtime, based on their capabilities, and in one embodiment is between 10 and 100, but in other embodiments it could be in the 1000s for a high-performance system.

At step 910, the solver 952 then adds the full new user list to the left list 954 and notifies the newly joined user of the list. At step 912, for each other user in the list, the solver 952 modifies the right list 956 to add the new user to the other users' lists, while maintaining distance order. Finally, at step 914, the solver 952 notifies each affected user of the newly added user. It is the responsibility of the user receiving the update to add, add and remove, or ignore the update, based on their list length and distance from the added user.

FIG. 10 illustrates a User Move Sequence process 1000 for MMO system 300. At step 1002, when a user moves, the position update is shared with MMO system 300 via a move message and broadcast to any other users connected to the moving user. At step 1004, the solver 952 receives the move message and looks up a limited list of users in the database 958 within a given radius of the moving user. At step 1006, if the position update is greater than a predefined threshold, the AOI system builds a new connection solution for the user. The user's list of connections is inspected and adjusted for users that have entered or left the spatial proximity of the moving user. At step 1008, the list is also adjusted to include logically proximate users, so users with a logical connection are preferentially added to the moving user's list of connections. Finally, at step 1010, the solver 952 notifies each affected user of the newly added user via an update list message.

FIG. 11 illustrates a User Disconnect Sequence process 1100 for MMO system 300. First, at step 1102, when a user leaves, a destroy event is shared with the MMO system 300 via a disconnect message. Next, at step 1104, the solver 952 receives the disconnect message. At step 1106, the solver 952 removes the disconnected user from the left list 954. Then, at step 1108, for each user that was in the disconnected user's list, the solver modifies the right list 956 and notifies each affected user of the deleted user. It is the responsibility of the user receiving the update to remove the subscription to the user.

For User Disconnect Sequence process 1100, in order to prevent cascading events, the leave action does not cause the affected users to re-solve for proximate users, which will result in an available slot for users that had a full list of connected users. This available slot may be filled on the next user move action.

New User Sequence process 900, User Move Sequence process 1000, and User Disconnect Sequence process 1100 assume that the MMO system 300 is running and ready to service requests. These actions affect the relationships between all users and the disposition of the virtual space, so the actions must be processed and shared. Solver 952 of MMO system 300 is responsible for grouping users based on spatial and logical relationships. Solver 952 serves to reduce overall system load and bandwidth to individual users by limiting visibility between users.

As this correlation between users is a many-to-many relationship, in order to gain efficiencies, solver 952 maintains lists of paired users. Paired users are exactly two users that are within proximity of one another.

Multiplayer hub 950 segments information so that it is discoverable. A user can join a scope and only see messages in the scope. This use of scope enforces the way users can interact. Users can move into a special world and migrate between scopes.

When a user changes scope, a message is published to solver 952 to synchronize that change. Group membership changes also need a solver 952 solution.

When subscriptions change, the MMO system 300 manages the objects in the scope owned by those changed subscriptions by destroying all objects owned by unsubscribed users and bringing into scope newly-subscribed-user objects. The MMO system 300 does this using the stored user identification, or userId, to indicate who owns the object. Objects that are designated as persistent, such as with a flag IsPersistent set to true, are not removed.

Example Applications

Connected spaces have the advantage of bringing people around the world together. On-site and off-site users can see each other and share a common experience across all consumer devices.

Specifically, on-site physical users can view and interact with a digital layer matched to the physical world through AR. They can have context from positioning and awareness of the content available around them even through traditional interfaces. Physical users have the ability to "replay" their experience, including content they did not engage with, but were proximate to.

Off-site digital users can view and interact with the same digital content over the digital twin through desktops, mobile devices, or VR. Off-site digital users can experience superpowers, such as flight. They can jump into video streams, including 360° views, of the physical site to get a more realistic view.

All users can view and interact with other users and content, regardless of platform, to the best of their device and network capabilities.

Numerous applications exist for connected spaces and Platform 100, system, and method for creating them. For example, Platform 100 allows companies to create, update, and manage a virtual online presence their consumers can engage in. Physical spaces can be connected with physical spaces. Platform 100 can connect physical spaces, such as malls, office buildings, entertainment centers, and museums, that are full of digital content and smart devices, allowing management of the digital layer for the physical spaces.

Users can collaborate across the lifecycle of a space. Unlike simple videoconferencing, Platform 100 puts everyone in the same room, regardless of the device, and gives them the ability to work together in real time.

Connected spaces can be used for smart buildings and cities. Buildings and public infrastructure are becoming more data-rich. Platform 100 offers the ability to make use of that information by empowering the physical and virtual occupants during design, construction, and beyond.

For media and entertainment, connected spaces can create immersive experiences. They can create better films and television programs by building worlds and capturing the story with traditional interfaces. They allow exploring ideas faster with fewer people to ensure the presentation of the best creative result on opening weekend, before the creation of video effects (VFX). Connected spaces make movies agile. Platform 100 provides the ability to see the project early and often when changes are easy and inexpensive. It can provide clarity on costs and outcomes before tough decisions have to be made, and it takes the risks out of the unknown.

Platform 100 allows connecting with the audience in new ways, such as making the brand's content personal, interactive, and engaging by giving the audience a role to play in the next generation of media and taking stories beyond theaters and screens, while benefitting the creation of that media on the way.

Platform 100 can simplify the complexity. As media becomes more digital, the complexity immobilizes everyone and sacrifices creativity and quality as costs run up. Platform 100 overcomes this by putting people around the globe 24 hours a day, 7 days a week (24/7), on the same page and looking at the same surroundings.

For live events, conferences, and location-based entertainment venues, the user experience can be customized with dynamic content that designers can refresh and update as needed.

Designing and planning can be done in context. Designers and planners can create narratives, trigger events, and manage entertainment plans across the site. They can explore ideas freely as a team while early in production so they can build and present the best experience on opening day.

Event-management mission control is possible by allowing visualization of connected systems. The APIs of existing systems can be connected for monitoring guest activity and operations in context. The large amount of information can be made actionable.

Connected spaces will allow for better connections with the audiences by making the guest experience personal and engaging by using guest analytics. It can provide a digital layer for the guests to engage with on their personal devices and make the event respond better to their interests.

Connected spaces allow one or more people to share their experience with the world. By consolidating digital content in a format that supports next-gen viewing devices, off-site engagement can be taken to new levels, drive more traffic to a physical location, and monetize it.

For retail centers, museums, and public spaces, users want and expect a digital layer. Platform 100 connects occupants of spaces to the opportunities around them in ways that give the operators visibility and enables the spaces to be customized to the occupants. It is possible to create narratives, trigger events, manage entertainment plans across the site. A digital layer can be created for guests to engage with on their mobile phones and devices to optimize traffic and make the space respond better to their needs.

Retail infrastructure can be managed from the inside. By connecting APIs to existing systems, guest activity and operations can be monitored in context and information can be made actionable.

Retail tenants can be offered a platform to connect with guests in the space. Data is a new type of utility like water and power. By sharing valuable guest analytics with tenants, it will allow tenants to make the guest experience personal and engaging and to help tenants succeed.

As digital content is consolidated digital content in a format that supports next-gen viewing devices, off-site engagement can be driven to new levels and more traffic can be driven to a physical retail location instead of online retail.

Future exhibits can be designed from within for museums and science centers. Platform 100 makes it possible for all teams to work on the same page and to try out ideas before opening day. When the exhibits are launched, they will engage a younger audience with interactivity in the way they are used to interacting with data.

Visitor experiences at museums or science centers can be better understood and managed. Platform 100 can monitor what is popular and what is not. Then attention can be directed where it is needed, pinch points identified, and flow can be adjusted in real time to accommodate linger areas.

Existing museum and science center exhibits can be captured and made accessible to remote visitors around the world. Immersive platforms make it possible to preserve exhibits, localize them, and share them to a global audience without the costs of traveling them while controlling access and monetizing them.

Connected spaces can solve the problem of limited space for a museum or science center because immersive content has no walls and can grow to suit content needs. The experience for physical visitors on the site can be as personal as for remote visitors.

Common operational pictures can exist for government spaces and use cases. Systems can be integrated via APIs to create a common interface that is accessible across platforms and teams. Physical assets and sites can be connected through digital twins so everyone is on the same page in real-time.

Platform 100 and connected spaces can provide an environment for master planning and training for government spaces by using digital twins and multi-user collaboration to develop, test, and train assets through scenarios before taking them to the real world. Immersive training for the team is significantly more effective at preparing them for the real world.

Platform 100 and connected spaces can provide situational awareness related to government spaces. The Platform 100 makes it possible for all teams to see the same information and collaborate with context. The team becomes far greater than the sum of the individuals when the world is an information-rich environment that is easily accessible and digestible.

Platform 100 and connected spaces can provide command and control of government spaces. They allow monitoring real-time events, coordinating assets on the ground, and running simulations in real-time in a simple contextual interface that resembles reality. Information and capabilities can be moved up and down the chain of command with levels of detail that match the context.

Platform 100 can work with smart cities. As urban infrastructure comes online and more connected spaces and buildings are built, the occupants expect an accessible layer of information in context for practical applications.

Platform 100 and connected spaces can be used for master planning for cities and buildings. They allow for live mission control overview of city events and monitoring data in context via APIs, instead of looking through different systems for pieces of information. Also, future and past events can be visualized in different layers to provide the overall context needed to enable city agents to arrive at the best decision.

Platform 100 and connected spaces can be used for civil and business operations for cities and buildings. For example, they can provide situational awareness for coordinated emergency response efforts, monitor data or devices in the environment in context for faster, better understanding, provide the ability to see teams on site and what critical information they're streaming, and push content in context to the team's mobile devices relevant to the things happening around them.

Platform 100 and connected spaces can also be used for resident and occupant services for cities and buildings by providing a better experience of what the city has to offer, providing way-finding and navigation, and providing access to richer content in context through mobile phones.

While the invention has been specifically described in connection with certain specific embodiments thereof, it is to be understood that this is by way of illustration and not of limitation. Reasonable variations and modifications are possible within the scope of the foregoing disclosure and drawings without departing from the spirit of the invention.

What is claimed is:

1. A massively multiplayer online (MMO) system for enabling a massive persistent, shared world space for a plurality of objects and a plurality of clients comprising:
   a plurality of microservices for maintaining a representation of a virtual world, the plurality of microservices comprising at least one multiplayer service wherein the at least one multiplayer service maintains the real-time state of a plurality of users and objects by a geographic region and broadcasts location and state changes to at least one user and at least one object in the geographic region;
   a plurality of resolvers for routing traffic to the plurality of microservices based on a real-time load;
   a plurality of load balancers for creating a connection between a plurality of clients and the plurality of microservices, wherein the connection comprises the lowest latency and lowest load on a per-connection basis;
   a plurality of multiplayer services associated with each of the plurality of load balancers, wherein to conserve bandwidth in real time the plurality of multiplayer services determine which of the plurality of users will participate in a message transaction based on relevancy of the message transaction to each of the plurality of users;
   a database for storing a status of each of a plurality of objects and each of the plurality of clients; and
   a global backplane for setting up and maintaining the connection between the plurality of clients and the plurality of microservices, and for transmitting messages between a plurality of service instances.

2. The system of claim 1 wherein the plurality of microservices further receive and route a plurality of messages between the plurality of clients.

3. The system of claim 2 wherein the plurality of messages comprises one or more instantiation messages.

4. The system of claim 2 wherein the plurality of messages comprises one or more update messages.

5. The system of claim 2 wherein the plurality of messages comprises one or more destruction messages.

6. The system of claim 2 where the plurality of messages is dynamically allocated based on client and object proximity.

7. The system of claim 2 wherein the plurality of microservices maintains a list of a plurality of connected clients and forwards the plurality of messages to the plurality of connected clients over the global backplane.

8. The system of claim 1 wherein the plurality of microservices comprises a user management service, wherein the user management service implements support for stateful user information.

9. The system of claim 1 wherein the plurality of microservices comprises an object prototype service, wherein the object prototype service provides object prototype and world object instantiation functionality.

10. The system of claim 1 wherein the plurality of microservices comprises a spatial data service, wherein the spatial data service comprises a plurality of cloud anchors for visual positioning and point of interest data.

11. A platform for a connected space comprising:

a point-of-interest system;

a visual positioning system;

a foundation; and a massively multiplayer online service comprising:

a plurality of microservices for maintaining a representation of a virtual world, the plurality of microservices comprising at least one multiplayer service wherein the at least one multiplayer service maintains the real-time state of a plurality of users and objects by a geographic region and broadcasts location and state changes to at least one user and at least one object in the geographic region;

a plurality of resolvers for routing traffic to the plurality of microservices based on a real-time load;

a plurality of load balancers for creating a connection between a plurality of clients and the plurality of microservices, wherein the connection comprises the lowest latency and lowest load on a per-connection basis;

a plurality of multiplayer services associated with each of the plurality of load balancers, wherein to conserve bandwidth in real time the plurality of multiplayer services determine which of the plurality of users will participate in a message transaction based on relevancy of the message transaction to each of the plurality of users;

a database for storing a status of each of a plurality of objects and each of the plurality of clients; and a global backplane for setting up and maintaining the connection between the plurality of clients and the plurality of microservices, and for transmitting messages between a plurality of service instances.

12. The platform of claim 11 wherein the connected space comprises a virtual reality connected space.

13. The platform of claim 11 wherein the connected space comprises an augmented reality connected space.

14. The platform of claim 11 wherein the connected space comprises a mixed reality connected space.

15. The platform of claim 11 wherein the connected space comprises an extended reality connected space.

16. The platform of claim 11 wherein the plurality of microservices further receive and route a plurality of messages between the plurality of clients.

17. The system of claim 16 wherein the plurality of messages comprises one or more instantiation messages.

18. The system of claim 16 wherein the plurality of messages comprises one or more update messages.

19. The system of claim 16 wherein the plurality of messages comprises one or more destruction messages.

20. The system of claim 16 where the plurality of messages is dynamically allocated based on client and object proximity.

21. The system of claim 16 wherein the plurality of microservices maintains a list of a plurality of connected clients and forwards the plurality of messages to the plurality of connected clients over the global backplane.

22. The system of claim 11 wherein the plurality of microservices comprises a user management service, wherein the user management service implements support for stateful user information.

23. The system of claim 11 wherein the plurality of microservices comprises an object prototype service, wherein the object prototype service provides object prototype and world object instantiation functionality.

24. The system of claim 11 wherein the plurality of microservices comprises a spatial data service, wherein the spatial data service comprises a plurality of cloud anchors for visual positioning and point of interest data.

\* \* \* \* \*